United States Patent [19]
Medard et al.

[11] Patent Number: 6,047,331
[45] Date of Patent: Apr. 4, 2000

[54] METHOD AND APPARATUS FOR AUTOMATIC PROTECTION SWITCHING

[75] Inventors: Muriel Medard, Lexington; Steven G. Finn, Framingham; Richard A. Barry, Cambridge; Robert G. Gallager, Gloucester, all of Mass.

[73] Assignee: Massachusetts Institute of Technology, Cambridge, Mass.

[21] Appl. No.: 08/803,169

[22] Filed: Feb. 19, 1997

[51] Int. Cl.[7] ............................................. G06F 13/00
[52] U.S. Cl. ............................................................ 709/239
[58] Field of Search ........................ 364/DIG. 1 MS File, 364/DIG. 2 MS File; 395/200.3, 200.48, 200.5, 200.51, 200.52, 200.53, 200.69, 200.82, 200.81; 370/216; 359/118, 168

[56] References Cited

U.S. PATENT DOCUMENTS

| | | | |
|---|---|---|---|
| 4,527,012 | 7/1985 | Caplan et al. | 179/18 ES |
| 5,210,871 | 5/1993 | Lala et al. | 395/650 |
| 5,243,704 | 9/1993 | Bary et al. | 395/325 |
| 5,271,014 | 12/1993 | Bruck et al. | 371/11.1 |
| 5,327,427 | 7/1994 | Sandesara | 370/85.14 |
| 5,333,130 | 7/1994 | Weissmann et al. | 370/16 |
| 5,408,462 | 4/1995 | Opoczynski | 370/16 |
| 5,515,367 | 5/1996 | Cox, Jr. et al. | 370/60.1 |
| 5,544,330 | 8/1996 | Bither et al. | 395/280 |
| 5,550,805 | 8/1996 | Takotori et al. | 370/16.1 |
| 5,572,513 | 11/1996 | Yamamoto et al. | 370/16 |
| 5,680,546 | 10/1997 | Chiaretti et al. | 395/200.69 |

OTHER PUBLICATIONS

Information and Computation 79, 43–59 (1988), "The Multi-Tree Approach to Reliability in Distributed Networks", Alon Itai and Michael Rodeh.

"A Quick Method for Finding Shortest Pairs of Disjoint Paths", Suurballe, et al., Networks, vol. 14 (1984) 325–336, 1984.

"Dynamics of Distributed Shortest–Path Routing Algorithms", Zaumon, et al., SRI International, 333 Ravenswood Avenue, Menlo Park, CA 94025, 1991 ACM 0–89791–444–9/91/0008/0031, pp. 31–43.

"Edge–Disjoint Branchng in directed Multigraphs", Shiloach, Computer Science Department, Stanford University, Standord, CA 94305, vol. 8, No. 1, Jan. 1979, pp. 24–27.

"Design and Performance of Convergence Routing on Multiple Spanning Trees", Yener, et al., 1994 IEEE, pp. 169–175.

"Optimal Routing in Circuit Switched Communication Networks", Gersht, et al., IEEE, vol. 37, No. 11 Nov. 1989, pp. 1203–1211.

"A Linear–Time Algorithm for Finding a Sparse κ–Connected Spanning Subgraph of a κ–Connected Graph[1]", Nagamochi[2], et al., Algorithmica (1992) 7: 583–596.

"On Algorithms for Enumerating All Circuits of A Graph", Mareri, et al. SIAM J. Comput., vol. 5, No. 1, Mar. 1976, pp. 90–99.

"Finding Maximal Link Disjoint Paths in a Multigraph", Whalen, et al., Tellabs, Inc. Research Center, 3702 N. Main Bldg. 2, Mishawaka, IN 46545, 1990 IEEE, pp. 403.6.1–403.6.5.

"Disjoint Paths in a Network", Suurballe, Netowrks, 4: 125–145, 1974 by John Wiley & Sons, Inc.

(List continued on next page.)

*Primary Examiner*—Robert B. Harrell
*Attorney, Agent, or Firm*—Christopher S. Daly; Nutter, McClennen & Fish, LLP

[57] ABSTRACT

A method and apparatus for generating first and second tree topologies for any source node in a network which can be represented as a node or an edge redundant graph, such that any node in the graph remains connected to the source node via at least one tree even after the failure of a node or an edge. This technique provides a recovery mechanism upon detection of a failure in a network.

38 Claims, 14 Drawing Sheets

OTHER PUBLICATIONS

"An Optimal Spare–Capacity Assignment Model for Survivable Netowrks with Hop Limits", Herzberg, et al., Telecom Australia Research Laboratories, 770 Blackburn Rd., Clayton vic. 3168, Australia, Globecom '94, vol. 3, pp. 1601–1606.

"Implementation of Self–Healing Function in ATM Networks", Kawamura, et al., Journal of Network & Systems Management, vol. 3, No. 3, 1995, pp. 243–265.

"Feasibility Study of a High–Speed SONET Self–Healing Ring Architecture in Future Interoffice Networks", Wu. et al. Nov. 1990, IEEE Communications Magazine, vol. 28, No. 11, pp. 33–51.

"Dimensioning of Self–Healing Rings and Their Interconnections", Shi, et al., School of Engineering & Computer Science, University of Texas at Dallas, EC 33, 2601 North Floyd Rd, Richardson, TX 75080, 1993 IEEE, pp. 1579–1583.

"An Algorithm for Designing Rings for Survivable Fiber Networks", Wasem, IEEE Transactions on Reliability, vol. 40, No. 4, Oct. 1991, pp. 428–432.

"A Capacity Comparison for SONET Self–Healing Ring Networks". Shyur, et al., Telecommunication Labs. DGT Taiwan R.O.C., 6F No. 16, Chinan Road. Sec. 2, Taipei 100, 1993 IEEE, pp. 1574–1578.

"Virtual Path Routing for Survivable ATM Networks", Murakami, IEEE/ACM Transactions on Networking, vol. 4, No. 1 Feb. 1996. pp. 22–39.

"Multicast Tree Generation in Networks With Asymmetric Links", Ramanathan, IEE/ACN Transactions on Networking, vol. 4, No. 4, Aug. 1996, pp. 558–568.

"Address Management and Connection Control for Multicast Communication Applications", Eleftheriadis, et al., Department of Electrical Engineering & Center for Telecommunications Research Columbia University, New York, NY 10027, pp. 386–393.

"Adaptive Multicast Routing in Single Rate Loss Networks", Hwang, Department of Computer Sciences & Information Engineering National Chung Cheng University, Chia-Yi, Taiwan, R.O.C., 1995 IEEE, pp. 571–578.

"Steiner Tree Problems", Hwang et al., Networks, vol. 22 (1992) 55–89.

"Steiner's problem in graphs: heuristic methods", Stefan Voss, Discrete Applied Mathematics 40 (1992) 45–72 North–Holland.

"A Good Algorithm for Edge–Disjoint Branching", Tarjan, Information Processing Letters, vol. 3, No. 2, Nov. 1974, pp. 51–53.

"Steiner Problem in Networks: A Survey", Winter, Networks, vol. 17 (1987) 129–167.

"Dynamic Steiner Tree Problem*", Imase et al., SIAM J. Disc. Math., vol. 4, No. 3. pp. 369–284, Aug. 1991.

"Path–Distance Heuristics for the Steiner Problem in Undirected Networks", Winter et al., Algorithmica (1992) 309–327.

"Routing of Multipoint Connections", Waxman, IEEE Journal on Selected Areas in Communications, vol. 6. No. 9, Dec. 1988.

"Routing to Multiple Destinations in Computer Networks", Bharath–Kumar et al., IEEE Transactions on Communications. vol. Com–31, No. 3, Mar. 1983.

"ARIES: A Rearrangeable Inexpensive Edge–based On–line Steiner Algorithm", Bauer et al., Computer Engineering Department University of California, Santa Cruz, CA 95064.IEEE, 1996.

"An SST–Based Algorithm for the Steiner Problem in Graphs", Beasely, Networks, vol. 19 (1989) 1–16.

"Design of Survivable Communications Networks under Performance Constraints", Newport, et al., IEEE Transactions on Reliability, vol. 40, No. 4, Oct. 1991.

"Forests, Frames, and Games: Algorithms for Matroid Sums and Applications[1]", Gabow, et al. Algorithmica, (1992) 7: 465–497.

"Routing Multipoint SONET Connections Using Virtual Paths in an ATM Network", Ammar, et al.,College of Computing, Georgia Institute of Technology, Aatlanta, Georgia 30332, 1993, IEEE, pp. 1c.4.1–1c.4.8.

"Broadband in the Local Loop", Phillips, Nov. 1994, pp. 37–42.

"Near Optimal Spare Capacity Planning in a Mesh Restorable Network", Grover, et al., Globecom '91, Phoenix, Arizona, Dec. 2–5, 1991, pp. 2007–2012.

Autonet: A High–Speed, Self–Configuring Local Area Network Using Point–to–Point Links, Schroeder, et al., IEEE Journal on Selected Areas in Communications, vol. 9, No. 8, Oct. 1991.

"Case Studies of Survivable Ring, Mesh and Mesh–Arc Hybrid Networks", Grover, Globecom '92, pp. 633–638.

"Decreasing Survivable Fiber network Cost Using Optical Switches", Wu, et al., IEEE Global Telecommunications Conference & Exhibition, Hollywood, Florida, Nov. 28–Dec. 1, 1988, vol. 1 of 3.

"Survivable Network Architectures of Broad–Band Fiber Optic Networks: Model and Performance Comparison", Wu. et al., Journal of Lightwave Technology, vol. 6. No. 11, Nov. 1988.

"Strategies and Technologies for Planning a Cost–Effective Survivable Fiber Network Architecture Using Optical Switches", Wu, et al., Journal of Lightwave Technology, vol. 8, No. 2, Feb. 1990.

"Graph Theoretic Models for Multicast Communications", North–Holland, Computer Networks and ISDN Systems 20 (1990) 95–99.

"Multicasting for Multimedia Applications", Kompella, Computer Sysems Laboratory Department of Computer Science and Engineering University of California, San Diego, La Jolla, CA 92093–0114.

"Greedy Algorithms for the On–Line Steiner Tree and Generalized Steiner Problems", Westbrook et al., Dept. of Computer Science, Yale University, New Haven, CT 06520–2158, Department of Operations Research, Yale University, New Haven, CT 06520–0162, pp. 622–633.

"Comparison of Dynamic Multicast Routing Algorithms for Wide–Area Packet Switched (Asynchronous Transfer Mode) Networks", Kadirire et al., University College London, Computer Science Department, Gower Street, London WC1E 6BT.

"Distributed Algorithms for Multicast Path Setup in Data Networks", Bauer et al., Computer Engineering Department University of CA, Santa Cruz, CA 95064, 1995 IEEE.

"Degree–Constrained Multicasting in Point–to–Point Networks", Bauer et al., Computer Engineering Department University of California, Santa Cruz, CA 95064, 1995 IEEE.

"Distributed Algorithms for Multicast Path Setup in Data Networks", Bauer et al., IEEE/ACM Transactions on Networking, vol. 4, No. 2, Apr. 1996.

"Dispersity Routing on ATM Networks", Naxencgyj ct ak,m /at&T Bell Laboratories, 1993 IEEE.

"An Optimal VP–Based Multicast Routing in ATM Networks", San–Baeg Kim, Telecommunication Networks Research Laboratories, Korea Telecom, 17 Woomyun–dong, Seocho–gu, Seoul, Korea, 1996 IEEE.

"Hierarchical Mullticast Routing in ATM Netowrks", Venkateswaran et al., School of EECS, Wahsington State University, Pullman, WA 99164–2752, AT&T Bell Laboratories, 101 Crawfords Corner Road, Holmdel, NJ 07747.

"Multipoint Connection Routing", Lee et al., International Journal of Digital and Analog Communication Systems, vol. 3, 177–186 (1990).

"Routing in the Manhattan Street Network", Maxemchuk. Transactions on Communications, vol. Com–35, No. 5, May 1987.

"Design and Performance of Convergence Routing on Multiple Spanning Trees", Yener et al., Globecom 94, vol. 1, 1994 IEEE.

"Protection Planning in Transmission Networks", Barezzani et al., Telettra S.p.A., Cinisello Balsamo (MI), Italy & UCLA Computer Science Dept., Los Angeles, CA, 1992 IEEE.

"Techniques for Finding Ring Covers in Survivable Networks", Gardner et al., Globecom '96, vol. 3, IEEE. pp. 1862–1866.

"Span–Disjoint Paths for Physical Diversity in Networks", Shaikh, Computers & Communications, 1995, pp. 127–133.

"Optimal Diverse Routing in Telecommunication Fiber Networks", Bhandari, AT&T Bell Laboratories, Crawfords Corner Road, Holmdel, NJ 077033, 1994 IEEE.

"Interconnection of Self–Healing Rings", Shi et al., University of Texas at Dallas, ICC. 1990.

"How Bad is Naive Multicast Routing?", Doar et al., University of Cambridge Computer Laboratory, New Museums Site, Pembroke Street, Cambridge CB2 3QG. U.K., 1993 IEEE.

"Combinatorial Algorithms", Edmonds, Courant Computer Science Symposium 9: Jan. 24–25, 1972.

"Increased capacity in an MS protection ring using WDM technique and OADM: the 'coloured section' ring", Hamel et al., Electronics Letters Online No: 19960118, Aug. 24, 1995.

"A Novel Passive Protected SONET Bi–Directional Self–Healing Ring Architecture", Wu et al., Bellcore, 331 Newman Springs Rd., Red Bank, NJ 07701–7040, MILCOM 1991.

"Use of quasi–distributed optical amplification in SONET self–healing inter–exchange networks", Goldstein et al.. Optical Fiber Communication Conference, 1992 Technical Digest Series. vol. 5, Conference Edition, Feb. 2–7, 1992, San Jose. California.

"Synchronizing The Rings and Chains of Sonet", 1995 Telecom Solutions, a division of SymmetriCom, Inc., Iss 3, pp. 1–11.

"Multiwavelength Ring Networks for Switch Consolidation and Interconnection", Wagner et al., Bellcore, 445 South Street, Morristown, NJ 07962, pp. 1173–1179, 1992 IEEE.

"OFC/IOOC'93", Conference on Optical Fiber communication/International Conference on Integrated Optics and Optical Fiber Communication, 1993 Technical Digest Series, vol. 4 Conference Edition, Feb. 21–26, 1993.

"A Class of Self–Healing Ring Architectures for SONET Network Applications", Wu et al., Bell Communications Research, 331 Newman Springs Road, Red Bank, NJ 07701, 1990 IEEE.

"A Self–Routing WDM High–Capacity SONET Ring Network", Way et al., IEEE Photonics Technology Letters, vol. 4, No. 4. Apr. 1992.

"An Optical FDM–Add/Drop Multiplexing Ring Network Utilizing Fiber Fabry–Perot Filters and Optical Circulators", Oda et al., IEE Photonics Technology Letters, vol. 5. No. 7. Jul. 1993.

"Multilayer add–drop multiplexers in a self–healing WDM ring network", "OFC '95 Optical Fiber Communication", Feb. 26–Mar. 3, 1995, vol. 8, 1995 Technical Digest Series.

"Optical wavelength add–drop multiplexer in installed submarine WdM network", Electronics Letters, Nov. 23, 1995, vol. 31, No. 24.

"A new answer to fiber protection", Edinger et al., Telephony/Apr. 1990.

"16ch Optical Add/Drop Multiplexer using Silca–Based Arrayed–Waveguide Gratings", Okamoto et al., NTT Optoelectronics Laboratories, 162 Tokai. Naka–gun, Ibaraki, 319–11, Japan, pp. 363–366.

"Anticrosstalk arrayed–waveguide add–drop multiplexer with foldback paths for penalty free transmission", Takahashi et al., Electronics Letters Online No: 19941371, Oct. 5, 1994.

"Demonstration of Optical FDM Based Self–Healing Ring Network Employing Arrayed–Waveguide–Grating ADM Filters and EDFAs". Toba et al., NTT Transmission Systems Laboratories, 1–2356, Take, Yokosuka, 238–03 Japan, NTT Optoelectronics Laboratories, Japan.

"Arrayed–waveguide grating add–drop multiplexer with loop–back optical paths", Tachikawa et al., Electronics Letters, Nov. 25, year unknown.

"Subcarrier–Multiplexed Signaling Based Add/Drop Multiplexer in Optical FDM Networks", Kitayama, IEEE Photonics Technology Letters, vol. 8, No. 6, Jun. 1996.

10 channel×10 Gbit/s WDM add/drop multiplexing/transmission experiment over 240Km of dispersion–shifted fibre employing unequally–spaced arrayed–waveguide–grating ADM filter with fold–back configuration, Fukui et al. Electronics Letters, Sep. 28, 1995, vol. 31. No. 20.

"A Fully Transparent Fiber–Optic Ring Architecture for WDM Netowrks", Irshid et al., Journal of Lightwave Technology, vol. 10. No. 1 Jan. 1992.

"Multiwavelength Erbium–Doped Power Limiting Amplifier in All–Optical Self–Healing Ring Network", Chen, et al., IEEE Photonics, Technology Letters, vol. 8, No. 6, Jun. 1996.

"SONET Bidirectional Ring Capacity Analysis: A Pragmatic View", Smith, et al., Southwestern Bell Technology Resources. St. Louis, Missouri, 1994 IEEE, vol. 1., pp. 489–493.

Narrow–Band Optical Channel–Dropping Filter, Haus, et al., Journal of Lightwave Technology, vol. 10, No. 1 Jan. 1992.

"Suppression of Signal Fluctuation Induced by Crosstalk Light in a Gain Saturated Laser Diode Amplifier", Inoue, IEEE Photonics Technology Letters, vol. 8, No. 3, Mar. 1996.

"Demonstration of WDM survivable unidirectional ring network using tunable channel dropping receivers", Tholey, et al., Electronics Letters Online No.: 19940905, Jun. 9, 1994.

"Optically–Amplified WDM Ring Network Incorporating Channel–Dropping Filters", Willner, et al., IEEE Photonics Technology Letters, vol. 6, No. 6, Jun. 1994.

"Self–Healing Ring Network Architecture Using WDM For Growth", Elrefaie, Bellcore, Red Bank, NJ 07701, pp. 285–288, Tu P1.16, 1992.

"A Capacity Comparison for SONET Self–Healing Ring Networks", Shyur, et al., Telecommunication Labs. DGT Taiwan, R.O.C. 6F No. 16, Chinan Road, Sec. 2, Taipei 100, Globecom 93, vol. 1.

"Vertex Cutsets of Undirected Graphs", Patvardhan, et al. 1995 IEEE, vol. 44. No. 2, Jun. 1995, pp. 347–353.

"Feasibility Study of a High–Speed SONET Self–Healing Ring Architecture in future Interoffice Networks", Wu, Nov. 1990, IEEE Communications Magazine.

"Multiwavelength Survivable Ring Network Architectures", Elrefaie, IEEE International conference on Communications '93, May 23–26, 1993, Geneva, Switzerland, Technical Program, Conference Record, vol. 2/3.

"Hierarchical Self–Healing Rings", Shi, IEEE/ACM Transactions on Networking, vol. 3, No. 6, Dec. 1995.

"An Algorithm for Survivable Network Design Employing Multiple Self–healing Rings", Slevinsky, et al., TRLabs, #800 Park Plaza, 10611 98 Avenue, Edmonton, Alberta, Canada, 5K 2P7, Globecom 93, vol. 3., pp. 1568–1573.

"Self–healing algorithm for logical mesh connection on ring networks", Tomizawa, et al., Electronics Letters, Sep. 15, 1994, vol. 30, No. 19.

"Development of SONET 2.4 Gbps 4–Fiber Ring Network System", Nakagawa, et al., NEC Research & Development, vol. 36, No. 4, Oct. 1995.

"High–Speed Self–Healing Ring Architectures for Future Interoffice Networks", Wu, et al. Dallas Globecom '89, Nov. 27–30, 1989, Communications Technology for the 1990s and Beyond, vol. 2 of 3.1.

Design of Hierarchical Self–Healing Ring Networks, Shi, et al., School of Engineering and Computer Science, University of Texas at Dallas, EC 33, 2601 North Floyd Road, Richardson, Texas 75080, 1994 IEEE, vol. 1, pp. 478–482.

"Optimal Topologies for Survivable Fiber Optic Networks Using Sonet Self–Healing Rings", Wasem, Globecom '91, Phoenix, Arizona. Dec. 2–5, 1991, vol. 3 of 3.

"A Class of Self–Healing Ring Architectures for SONET Network Applications", Wu, et al., Globecom '90, IEEE Global Telecommunications Conference & Exhibition, San Diego, California, Dec. 2–5, 1990, vol. 1 of 3.

"A Novel Passive Protected SONET Bidirectional Self–Healing Ring Architecture", Wu, et al., Journal of Lightwave Technology, vol. 10, No. 9, Sep. 1992.

"Distributed Self–Healing Control in SONET", Sakauchi, et al., Journal of Network and systems Management, vol. 1, No. 2, 1993.

"A Multi–layer Restoration Strategy for Reconfigurable Networks", Chng, et al., Systems Research Division, BT Laboratories, Martlesham Health, U.K., Dept. of electronic Systems Engineering, University of Esses, U.K., Globecom '94, vol. 3, pp. 1872–1878.

"A Passive Protected Self–Healing Mesh Network architecture and Applications", Wu, IEEE/ACM Transactions on Networking, vol. 2, No. 1, Feb. 1994.

"Distributed Control Algorithms for Dynamic Restoration in DCS Mesh Networks: Performance Evaluation", Kobrinsk,I et al., Globecom '93, vol. 3, pp. 1584–1588.

"Performance Analysis of Fast Distributed Network Restoration Algorithms", Bicknell, et al., Globecom 93, vol. 3, pp. 1596–1600.

"Double Search Self–Healing Algorithm and Its Characteristics", Fujii, et al., Electronics and Communications in Japan, Part 1, vol. 77, No. 3, 1994.

"Fitness Failure Immunization Technology for Network Service Survivability", Yang, et al., Globecom 88, vol. 3, pp. 1549–1554.

"The Selfhealing Network", A Fast Distributed Restoration Technique for Networks Using Digital Crossconnect Machines, Grover, Globecom '87, vol. 2, pp. 1090–1095.

"Dynamic Reconfiguration of Digital Cross–Connect Systems with Network Control and Management", Hasegawa. et al., Globecom '87, vol. 2., pp. 28.3.1–28.3.5.

"Automatic Restoration of Telecommunication Networks", Mansour, et al., Symposium on Computers and Communications, 1995, pp. 141–147.

"Recovering Guaranteed Performance Service Connections from Single and Multiple Faults", Banerjea, et al., Globecom '94, vol. 1, pp. 162–168.

"Effect of Traffic Splitting on Link and Path Restoration Planning", Veerasamy, et al., Globecom '94, vol. 3, pp. 1867–1871.

"Reliable Switching System Recovery", Nakamura, et al., Globecom '94, vol. 3, pp. 1596–1600.

"A Fast Distributed Network Restoration Algorithm", Chow, et al., Twelfth Annual International Phoenix Conference on Computers and Communications, Tempe, Arizona, Mar. 23–26, 1993.

"Distributed Restoration Strategies in Telecommunications Networks", Johnson, et al., ICC '94, vol. 1, pp. 483–488.

Dynamic Bandwidth–Allocation and Path–Restoration in SONET Self–Healing Networks, Gersht, et al., IEEE Transactions on Reliability. vol. 45, No. 2, Jun. 1996.

"Comparison of Capacity Efficiency of DCS Network Restoration Routing Techniques", doverspike, et al., Journal of Network and Systems Management, vol. 2, No. 2, 1994.

"On a Scalable Topology for Lightwave Networks", Venkateswaran, et al., Department of Computer Science University of South Carolina, Columbia, Sc 29208, 1996, pp. 427–434.

"Optimal Capacity Placement for Path Restoration in Mesh Survivable Networks", Iraschko, et al., ICC '96, consisting of eight unnumbered pages.

"Topological Layout of Links for Optimizing the S–T Reliability in a Computer Communication System", Aggarwal, et al., Microelectron. Reliab., vol. 22, No. 3, pp. 341–345, 1982.

"Network Topology for Maximizing the Terminal Reliability in a Computer Communication Network", Chopra, et al., Microelectron.Reliab., vol. 24, No. 5, pp. 911–913, 1984.

"Topological Layout of Links for Optimizing the Overall Reliability in a Computer Communication System", Aggarwal, et al., Microelectron. Reliab., vol. 22, No. 3, pp. 347–351, 1982.

"Survivable Network Architectures for Broad–Band Fiber Optic Networks: Model and Performance Comparison", Wu, et al., Journal of Lightwave Technology, vol. 6., No. 11, Nov. 1988.

Protocols for a Self–Healing Network, Green, Applied Machine Intelligence, 26462 Briarwood Lane, San Juan Capistrano, CA 92675, 1995, pp. 252–256.

Self–Healing Ring Networks: Gateway to Public Information Networking, Towster, et al., Jun. 1990, IEEE Communications Magazine.

Fiber Network Survivability, Flanagan, Jun. 1990, IEEE Communications Magazine.

"Using Distributed Topology Update and Preplanned Configurations to Achieve Trunk Network Survivability", Coan, et al., IEEE Transactions on Reliability, vol. 40, No. 4, Oct. 1991.

"A Multi–Period Design Model for Survivable Network Architecture Selection for SONET Interoffice Networks", Wu, et al., IEEE Transactions on Reliability, vol. 40, No. 4, Oct. 1991.

METHOD AND APPARATUS FOR AUTOMATIC PROTECTION SWITCHING

GOVERNMENT RIGHTS

This invention was made with government support under Contract No. 719628-95-C-0002 awarded by the Department of the Air Force. The Government has certain rights in this invention.

FIELD OF THE INVENTION

This invention relates generally to communication or power networks and more particularly to a method and apparatus for planning and implementing automatic protection switching in networks.

BACKGROUND OF THE INVENTION

As is known in the art, a network includes a plurality of processing sites generally referred to as stations or nodes connected by one or more physical and/or logical connections. When the connections establish transmission of a signal in one direction between the nodes, the connections are generally referred to as links. Each node typically performs a switching function and one or more additional functions.

The nodes may be coupled together in a variety of different network structures typically referred to as network topologies. For example, network nodes made be coupled in a circular structure, generally referred to as a ring topology. Other topologies such as star topologies and tree topologies are also known.

The transmission of a signal from a first or source node to a second or destination node may involve the transmission of the signal through a plurality of intermediate links and nodes coupled between the source node and the destination node. Such a succession of links and nodes between a source node and a destination node is referred to as a path.

When a link or node in a path fails, communication between a source node and a destination node in that path is disrupted. Thus, to continue communications between the source and destination nodes, an alternate path must be found and the signal being transmitted from the source node to the destination is routed through the alternate path.

A self-healing network refers to a network which automatically restores connections among nodes in the event of a link or node failure in a path from a source node to a destination node. There is a growing trend and reliance on such networks owing to increasing reliance on and use of high-speed communication networks and the requirement that these communication networks be robust in the case of certain failures. Self-healing networks are central not only to applications where failures occur very often, such as military networks under attack, but also in public networks where failures, albeit rare, can be extremely disruptive. Self-healing networks can also be used in power transmission grids to aid in the distribution of power signals in a power network. Thus self healing networks have use in a wide variety of applications including but not limited to communications networks and power systems networks.

Self-healing networks typically detect and report a failure, establish and connect a restoration path and then return the network to normal communications. Such self-healing characteristics are incorporated, for example, in the Synchronous Optical Network (SONET) protocols.

A network may be represented as a graph which includes nodes representing the network nodes and edges representing bi-directional connections between the nodes. For a network to be capable of having a self-healing feature which leaves all nodes mutually connected even after the failure of a node and/or an edge, a graph representing the network must be either node or edge redundant. A node redundant graph is a graph in which the nodes remain mutually connected even after the elimination of any node in the network. Similarly, an edge redundant graph is a graph in which the nodes remain mutually connected even after elimination of any edge in the network. Node or edge redundancy ensures that all nodes remain connected even after the failure of a node or edge, respectively. One problem, however, is that not all self-healing techniques are guaranteed to work over an arbitrary redundant network (i.e. a network having some portions which are node redundant and other portions which are edge redundant). For instance, a technique which performs self-healing locally may not be able to use the redundancy afforded by a more distant part of the network. Node or edge redundancy is thus the minimum topological requirement for a network to perform self-healing which allows all remaining nodes to remain mutually connected after failure of a node or edge.

Self-healing networks can be classified according to the following three criteria: (1) the use of line (or link) rerouting versus path (or end-to-end) rerouting, (2) the use of centralized versus distributed schemes and (3) the use of precomputed versus dynamically computed routes. The criterion of link rerouting versus path rerouting maps to the criterion, common in optimization, of local versus global. The different criteria are not in practice, selected independently of each other for self-healing networks. Because path rerouting is less local in nature than link rerouting, path rerouting schemes are not usually distributed.

Furthermore, since path rerouting tends to require a relatively large amount of computation and covers a relatively large span of a network compared with link rerouting, path rerouting is typically implemented using precomputed routes. Link rerouting, which usually considers only a few hops away from the rerouted link in the network, is better suited to dynamically computed routes and thus may be done in a distributed fashion.

For example, in a bi-directional self-healing ring (SHR), after a link failure, traffic that was previously carried along one link is carried around the rest of the ring on a second link using a technique generally referred to as loopback. Thus, in this particular case, path rerouting can be used.

One problem with this approach, however, is that a limitation may exist with respect to the number of nodes which may be traversed to replace the failed link. If there is a hop limit, for example, link rerouting may not be possible in a network having a ring topology.

One of the most common ways in SONET to restore rapidly network functionality is to combine SHRs and diversity protection (DP), using add-drop multiplexers (ADMs), for automatic protection switching. Systems using One-to-n (1:n) DP have one back up fiber for n fibers. SHRs perform loopback, which may be regarded as a special case of APS. SHR architectures may be classified into unidirectional rings, in which the duplex channel travels over a different path than the forward channel, and bi-directional rings where the forward channel and the duplex channel travel the same path. Bi-directional rings typically include two or four fibers. Using mechanical ADMs, the restoration time is typically about 50 milliseconds (ms) while path switching typically requires less than 20 ms and loopback switching typically require under 80 ms. DP or SHR architectures typically require about 10 ms to detect and 50 ms to complete the switch.

One problem with the DP and SHRs approaches is that they require built-in excess capacity to handle failures. Moreover such systems may be difficult to upgrade as more nodes are added to the network. A system utilizing one-to-one (1:1) DP requires the most spare capacity, since the spare capacity is the same as the capacity used during normal operation. SHRs may require as much spare capacity as DP, depending upon network traffic patterns.

Furthermore, placing constraints on possible network topology may result in increased network cost. For example, a ring topology may be used in a particular application to implement APS. The ring topology, however, may not be the most cost effective topology for the application. This results in a relatively expensive network.

It would, therefore, be desirable to provide a system which allows APS over any arbitrary network topology. Such a system can be used with any existing topology, allows relatively inexpensive expansion of existing networks regardless of topology and allows construction of new and relatively inexpensive networks.

Another approach to self-healing which is faster than the above approaches is achieved by using optical switches such as acousto-optical switches. Optical switches allow switching to a backup fiber, in a time delay which is in the order of micro-seconds ($\mu s$). For four-fiber bi-directional rings, optical switches and amplifiers have been proposed to act as ADMs. Optical wavelength division multiplex (WDM) ADMs have been proposed to add/drop channels within a fiber rather than add/drop whole fibers. Such WDM ADMs are useful to overcome the limitation in capacity of traditional SONET ADMs. Many optical WDM ADMs have been proposed and demonstrated. Being able to drop channels rather than whole fibers also gives more flexibility in operating SHRs. WDM survivable rings using a single switch central office have been proposed.

Still another class of self-healing networks which reduces the amount of spare capacity needed, involves utilizing real-time spare capacity in either a distributed or a centralized dynamic restoration system. Thus, real-time excess capacity is used to transmit in case of a failure. This class of self-healing schemes commonly relies on digital cross-connect systems (DCSs) which provide greater flexibility than ADMs. However, such schemes utilize real-time spare capacity at the expense of relatively complex and computationally intensive software processing and thus greater time delays.

Yet other approaches attempt to perform optimal routing in centralized circuit switched networks with the goal of preserving spare capacity. While centralized restoration offers improvement in terms of spare capacity utilization over distributed restoration, it requires real-time computation having a complexity which increases with increasing network size. Thus, one problem with a centralized restoration approach is that it is relatively slow, with restoration times reaching minutes.

To overcome the relatively slow restoration times which occur in centralized restoration schemes, dynamic restoration schemes utilizing distributed control or a hybrid of distributed and centralized control are used. The greatest improvements in speed are provided by distributed schemes. A variety of different distributed schemes have been proposed, each of which rely on some variation of a sender-chooser scheme where a sender floods a network with help messages and a chooser selects a restoration path based on reception of those help messages. Other schemes involve a single sender-chooser pair, one sender and multiple choosers, two senders and two choosers, etc. . . . Thus, suffice it to say that a variety of different self-healing schemes each having different drawbacks and limitations have been used.

In addition to self-healing features another feature of increasing importance in networks is that of a multicasting operation. Multicasting refers to transmission of a signal from a source node to a predetermined set of nodes in a network. When the set of nodes corresponds to all of the nodes in the network, the operation is referred to as a broadcast operation. It is desirable to provide networks having a multicasting feature since in many types of networks, it is relatively simple for a node to receive a signal and replicate it for transmission to several other nodes. The need for such an ability tends to occur relatively often in relatively high-bandwidth networks.

For instance, a server may transmit a single video signal to several receivers or a file server may simultaneously back up data stored thereon to several geographically separate locations. Multicasting is relatively easy to perform when the network nodes are connected in a tree topology. In networks which allow duplication of signals at nodes, a link need only carry at most a single copy of a multicast signal. All-optical nodes for instance, allow simple replication by splitting a first received optical signal into a pair of optical signals and thereafter amplifying the pair of optical signals. The SONET standard, for example, includes a multicasting standard.

If a network is provided having a tree topology and an edge failure occurs in a tree originating at some source node S, all the nodes in the tree which were connected to the source node S that are not downstream of that failure are still connected by the same tree. The nodes of the tree which are downstream of the failure, however, are no longer connected owing to the edge failure. Complete functionality is restored to the network by re-connecting to the source node S the nodes that were downstream of the failure.

It would, therefore, be desirable to provide a network having a redundant tree topology in which such re-connection is possible for both link and node failures. It would also be desirable to provide a means for constructing a tree topology on any node or edge redundant network so that failure of a node or edge does not disconnect any node from the network.

SUMMARY OF THE INVENTION

In view of the above problems and limitations of existing self-healing schemes and in accordance with the present invention, it has been recognized that combining the need for self-healing networks with the usefulness and desirability of performing multicasting operations in mesh and other networks leads to the problem of self-healing networks having a logical tree topology. As described herein, a tree topology refers to a topology having no cycles and in which every node has a single incoming arc and in which all nodes are mutually connected.

It would, therefore, be desirable to provide a self-healing network having a topology which allows multicasting to be accomplished in a relatively easy manner. It would also be desirable to provide a technique to generate logical tree topologies for arbitrary redundant networks since it provides compatibility with all existing redundant networks and, when building new networks, requires no special consideration for the type of self-healing mechanisms used.

In accordance with the present invention, an apparatus for generating first and second tree topologies for any source node in a network which can be represented as a node redundant graph, such that any node in the graph remains connected to the source node via at least one tree even after the failure of a node includes means for selecting a source node from a plurality of nodes, means for selecting a cycle around the source node, means for assigning first and second source node values to the source node and means for assigning a node value to each of the first plurality of nodes wherein the node value assigned to each node decreases in a first direction around the cycle. The apparatus further includes means for constructing a first and second set of arcs, each of the arcs in the first set connecting an upstream node and a downstream node with the upstream node having a node value which is greater than the node value of the downstream node and each of the arcs in the second set connecting an upstream node and a downstream node with the upstream node having a node value which is less than the node value of the downstream node. With this particular arrangement, an apparatus for generating tree structures on any node redundant network topology so that failure of any single node leaves all remaining nodes connected is provided. By providing a redundant tree structure, a network having rapid fault recovery is provided. The benefits of such an apparatus are that the apparatus can be utilized in arbitrary redundant networks. Additionally, the apparatus allows selection of particular edges to be used to form tree topologies and thus the apparatus can generate a large number of tree topologies for a single network. Furthermore, the tree structures provided by the apparatus of the present invention are well suited to broadcasting and/or multicasting operations. In one particular embodiment, the technique of the present invention includes a means for taking into account costs to allow selection of particular tree structures from a plurality of different tree structures. The main cost component of the system may be specified, for example, as network topology or network capacity. Other cost components such as computational complexity may also be specified. Depending upon the specified criteria, a preferred pair of redundant tree structures may be selected from a plurality of different redundant tree structures. Thus, it is possible to select sets of redundant trees which optimize predetermined network performance or cost criteria. Moreover the particular tree topologies obtained may be taken into account when generating a network. For example, it is possible to generate unbalanced tree structures having relatively long individual paths. Alternatively balanced tree structures having relatively short paths may be generated.

In accordance with a further aspect of the present invention, an apparatus for generating first and second tree topologies for any source node in a network which can be represented as an edge redundant graph, such that any node in the graph remains connected to the source node via at least one tree even after the failure of any edge in the graph includes means for selecting a source node from a plurality of nodes, means for selecting a cycle around the source node, means for assigning first and second source node values to the source node and each of a first plurality of nodes in the cycle wherein the node values assigned to each node decrease in a first direction around the cycle and increase in a second opposite direction around the cycle. The apparatus further includes means for constructing first and second sets of arcs, each of the arcs in the first set connecting an upstream node and a downstream node with the upstream node in each of the first set of arcs having a node value which is greater than a node value of the downstream node and each of the arcs in the second set connecting an upstream node and a downstream node with the upstream node in each of the second set of arcs having a node value which is less than a node value of the downstream node. With this particular arrangement, a technique for generating tree structures on any edge redundant network topology so that failure of any edge leaves all remaining nodes connected is provided. By providing a redundant tree structure, a network having rapid fault recovery is provided. The benefits of such an apparatus are that it can be applied to arbitrary redundant networks, that it provides great flexibility in selecting which particular edges can be used to form the trees and that the tree structures yielded are well suited to broadcasting and/or multicasting operations. The main cost component of the system may be specified as network topology or network capacity. In other cases, it may be desirable to specify other cost components such as computational complexity. Depending upon the specified criteria, a preferred one of a plurality of redundant tree structures may be provided.

The techniques of the present invention thus generate pairs of directed trees which are redundant after the failure of a node or of two directed links corresponding to one undirected link. The technique, however, only requires that the network have the characteristic that it is either node redundant or edge redundant. The only currently used approaches which are applicable to any node or edge redundant graphs consider a pair of node-disjoint or edge-disjoint paths for each pair of communicating nodes and do not guarantee trees. The technique of the present invention does not require any limitation with respect to node-disjoint or edge-disjoint paths. Furthermore, with the present invention, it is not necessary to designate a chooser node, rather each disrupted node is allowed to operate and function as a sender. Thus, the networks are relatively flexible and can be utilized in a variety of different network applications including asynchronous transfer mode (ATM) and SONET applications.

In accordance with a still further aspect of the present invention, a method of establishing at least a pair of paths between a source node and a destination node in a network including a plurality of nodes, includes the steps of (a) selecting a source node, (b) selecting a cycle around the source node, (c) assigning first and second source node values to the source node, (d) assigning a node value to each of a first plurality of nodes in the cycle wherein the node values assigned to each node decrease in a first direction around the cycle, (e) constructing a first set of arcs, each of the arcs connecting an upstream node and a downstream node, the upstream node in each of the arcs having a node value which is greater than the node value of the downstream node and (f) constructing a second set of arcs, each of the arcs connecting an upstream node and a downstream node, the upstream node in each of the arcs having a node value which is less than the node value of the downstream node. With this particular technique, for any node redundant undirected graph, two directed trees can be built from an arbitrary undirected spanning tree, such that eliminating any node of the undirected graph leaves each node in the graph connected by at least one of the two directed trees. To determine if all nodes desired to be connected are connected, the method further includes the steps of determining if the first plurality of nodes in the cycle includes each of the nodes to be connected in the network and in response to the first plurality of nodes in the cycle not including each of the plurality of nodes to be connected then performing the steps of: (1) selecting a first path having a starting node, an ending node and at least one intermediate node wherein the starting node corresponds to one of the first plurality of nodes in the cycle, the ending node corresponds to a second different one of the first plurality of nodes in the cycle having a value less than the value of the starting node and each of the at least one intermediate nodes corresponds to a node not included in the first plurality of nodes in the cycle; and (2) assigning a node value to each of the at least one intermediate nodes wherein the node values assigned to each of the at least one intermediate nodes decrease when traversing the first path in a direction from the starting node to the ending node. With this approach, an arbitrary number of nodes can be included in the process to provide an ordered set of nodes which can be used to form the pair of redundant trees. In one embodiment, the step of assigning a node value to each of the at least one intermediate nodes includes the step of assigning the intermediate node immediately prior to the ending node a value which is greater than the maximum of: (i) the second value of the source node; and (ii) the value of any node included in the cycle and the path and already assigned a value which is smaller than the value of the starting node. With this approach, nodes are ordered in a particular manner. Once the nodes are ordered as desired, a first set of arcs can be constructed on the first path. Each of the arcs link an upstream node and a downstream node, the upstream node in each of the arcs having a node value which is greater than an assigned node value of the downstream node. Also a second set of arcs on the first path can be constructed. Each of the arcs connect an upstream node and a downstream node, the upstream node in each of the arcs having a node value which is less than an assigned node value of the downstream node. Once the arcs have been selected, the first and second tree topologies can be selected by selecting first and second sets of arcs along the path between the starting node and the ending node. In the first set of arcs, the value of each of the nodes decreases along the direction of the arc and in the second set of arcs, the value of each of the nodes increases along the direction of the arcs. The source node is assigned two different values. A first one of the values is the largest node value in the arcs and the second node value is the smallest node value in the arcs.

In accordance with a still further aspect of the present invention, a method of generating a pair of directed trees from an arbitrary undirected spanning tree includes the steps of (a) selecting a source node, (b) selecting a first cycle around the source node, (c) assigning first and second source node values to the source node, (d) assigning first and second node values to each of a first plurality of nodes in the cycle wherein first ones of the first and second node values assigned to each of the first plurality of nodes decrease in value in a first direction around the first cycle and second ones of the first and second node values assigned to each node decrease in value in the first direction around the first cycle and wherein for each node the first node value is greater than the second node value. The method further includes the step of (e) constructing first and second sets of arcs, each of the arcs linking an upstream node and a downstream node in the first cycle. In the first set of arcs, the upstream node has a node value which is greater than a node value of the downstream node and in the second set of arcs, the upstream node has a node value which is less than a node value of the downstream node. With this particular technique, for any edge-redundant graph a pair of directed trees can be generated from an arbitrary undirected spanning tree, such that eliminating any edge of the undirected graph leaves each node connected by at least one of the pair of directed trees.

The above described techniques of the present invention may be modified to take into account cost functions. Any cost function can be applied to selected cycles and paths. Thus, the cost functions, such as delay minimization, which are usually associated with Steiner trees for multicasting can be taken into account when selecting cycles and paths.

Furthermore, the above described techniques may be implemented in a distributed fashion for edge redundancy under certain conditions. Since the union of two trees which share a single node is a tree if the shared node is a source in one of the trees, the techniques of the present invention can be independently applied to two or more networks which share a single node to independently generate redundant tree pairs for each of the two or more networks. First ones of the redundant tree pairs can be joined to form a first composite redundant tree and second ones of the redundant tree pairs can be joined to form a second composite redundant tree.

It should be noted that the techniques of the present invention have applicability to a wide variety of different types of networks. For example, the techniques may be used to generate tree topologies in communications networks, power networks, chemical supply networks and any other type of network including but not limited to a variety of different supply chain networks. Thus the term "network" as used hereinbelow refers to a collection of assets, switching apparatus and conduits which permit the transmission of resources. Thus, the networks may be used for communications systems, water or chemical distribution systems and distribution systems in general. In one embodiment, the network may be provided as the internet. The resources may be provided as electrical signals such as power signals, information signals, etc . . . or alternatively the resources may be provided as solids or fluids such as gas or liquid fluids.

BRIEF DESCRIPTION OF THE DRAWINGS

The foregoing features of this invention as well as the invention itself may be more fully understood from the following detailed description of the drawings in which.

DESCRIPTION OF THE PREFERRED EMBODIMENTS

Before describing the processing to be performed by and on networks, it should be appreciated that, in an effort to promote clarity, reference is sometimes made herein to "signals" or "information" being transmitted between "nodes" or "stations" of a "network." Such reference should not be taken as being limited to a communications network. Rather, as mentioned above, the present invention finds application in a wide variety of different network types including but not limited to communications networks, power networks, chemical supply networks and supply chain networks.

Accordingly, those of ordinary skill in the art will appreciate that the description and processing taking place on "signals" and "information" could equally be taking place on a power signal, a communication signal a fluid or any other resource. Likewise, the nodes or stations may include electrical apparatus, mechanical apparatus, optical apparatus or any other apparatus appropriate to process the resource being provided to the node.

Figure 1:
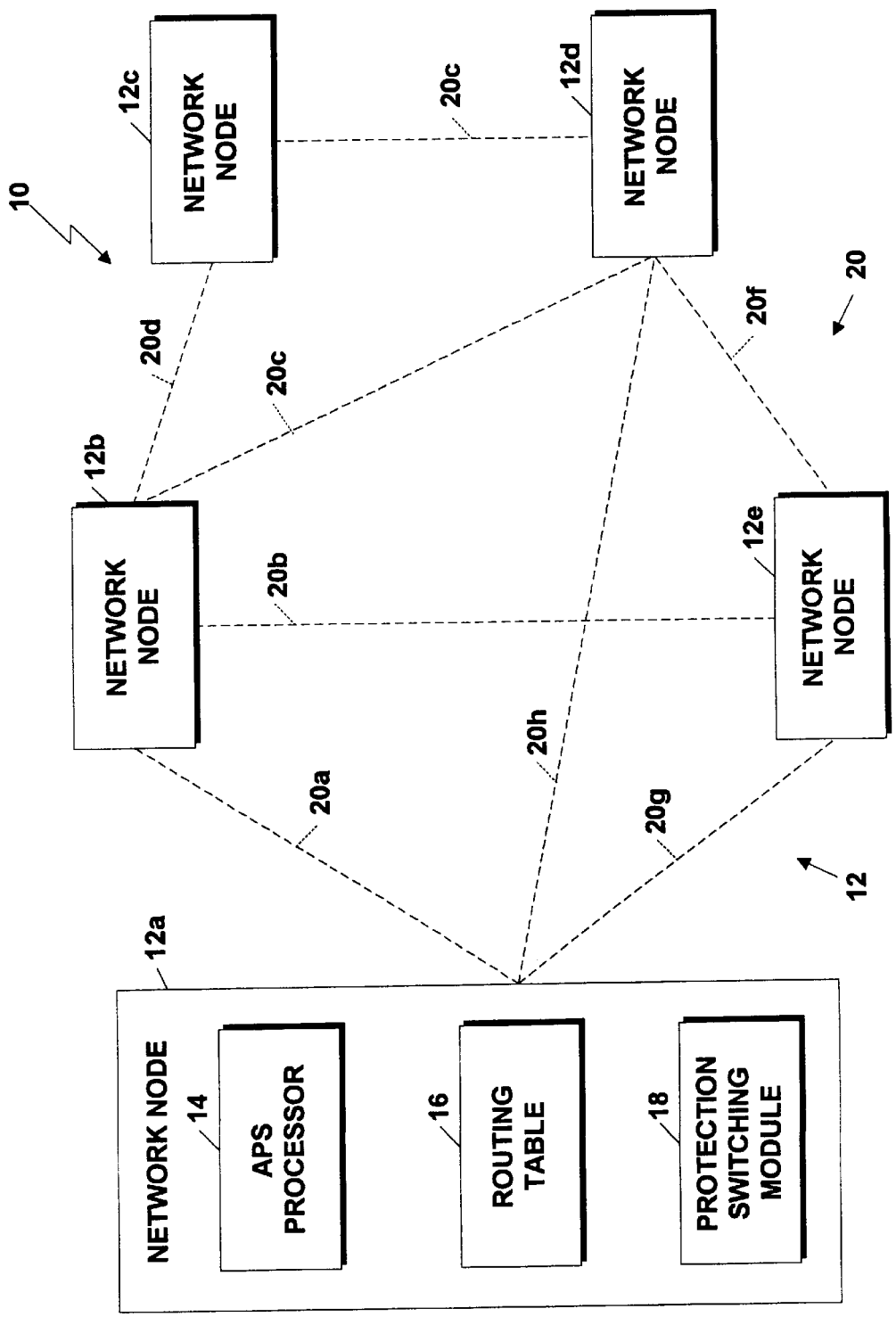
FIG. 1 is a block diagram of a network.

Referring now to FIG. 1, a network 10 includes a plurality of stations or nodes 12a–12e generally denoted 12. Nodes 12 can be coupled as shown through links 20a–20h generally denoted 20. As used herein the term "link" refers to a physical connection between two nodes. It should be noted that, although not illustrated in FIG. 1, it is possible for a separate physical link to exist between each of the nodes 12a–12e in the network. For example, a separate link may be provided from node 12a to each of nodes 12b–12e. Owing to cost considerations, physical construction limitations and technological limitations, however, separate links are typically not provided between each of the nodes 12a–12e.

In some applications, a physical connection (e.g., a fiber optic cable) may connect two nodes, however, there may be no preferred logical connection between the two nodes despite the existence of the physical connection. That is, the preferred path between the two nodes may involve a third node and corresponding links to the third node rather than the direct link between the two nodes. For example, if the direct link between two nodes is unreliable, then it may be desirable to not transmit information or other signals such as data, voice or power signals across this link. Thus, in accordance with the techniques of the present invention and for reasons to be described hereinbelow, only predetermined logical connections are made between the nodes 12a–12e.

In general overview and taking network node 12a as representatives of nodes 12b–12e, network node 12a includes an automatic protection switch (APS) processor 14, a routing table 16 and a protection switching module 18. APS processor 14 receives information describing the network 10. Such information typically includes, but is not limited to the number of nodes to be connected in the network, the number of links which exist in the network, traffic load, information identifying which of the paths 20 are available to connect particular ones of nodes 12 in existing network 10, the nodes and links which should be used to re-route signals in the event of a failure, etc. . . .

As an alternative to APS processor being provided as part of a network node as shown in FIG. 1, APS processor 14 may be provided as part of a network planning system. In this case, APS processor 14 receives information concerning the number of nodes which will be eventually included in the network or subnetwork as well as information concerning the availability or desirability of installing and/or maintaining network links between particular nodes, traffic load and cost information with respect to installation and maintenance of the links and nodes, etc . . .

In response to the information provided to APS Processor 14, APS Processor 14 computes pairs of tree topologies for each source-node/destination-node pair in the network. APS processor 14 then designates preferred links 20 between each of the network nodes 12a–12e in accordance with the computed tree topologies and any other rules provided thereto.

Once the preferred network topologies and paths between each of the nodes 12a–12e are computed, the path information is stored in a routing table 16. Routing table 16 has stored therein a particular primary order and a particular secondary order of switching entities and links which define primary and secondary paths between the nodes 12a–12e and which are part of primary and secondary tree topology network configurations. Thus, each source node is provided having a primary path and a secondary path to every other node 12 in the network. Moreover, since the primary and secondary paths are provided as part of primary and secondary tree topologies, multicasting can be implemented relatively easily within the network.

In response to signals from protection switching module 18, if a link or a network node in a primary path between a source node and destination node fails, then information concerning the nodes and links and preferred paths among nodes stored in routing table 16 can be accessed and used to re-route automatically the signals through the secondary or protection path thereby allowing flow between the source node and destination node despite the failure of the link or node. For example, designating node 12a as a source node and node 12c as a destination node, a primary path between source node 12a and destination node 12c may include link 20a, node 12b and link 20d. If link 20a fails, then protection switching module 18 detects the failure, by the absence of appropriate flow (e.g. lack of power, missing pilot tone, diagnostic signal not appropriately received) and a predetermined secondary path between source node 12a and destination node 12c stored in routing table 16 in source node 12a is used to re-route automatically signals through the pre-determined secondary path which may include, for example, link 20h, node 12d and link 20e. Thus routing table 16 has stored therein information which specifies how to re-route the flow between nodes.

It should be noted that in a preferred embodiment, the primary and protection paths are pre-computed and thus the switching can be accomplished automatically with minimal time delay. Alternatively, the secondary tree path may be computed dynamically in the APS processor 14 and provided to routing table 16. Further alternatively, the flow may be transmitted simultaneously on the primary and secondary trees and the destination node autonomously switches to flow on the secondary tree, possibly after some synchronization.

It should also be noted that in the case of an existing network, the desired tree topologies computed by APS processor 14 may be computed in a distributed fashion. That is, processors at each node compute tree topologies considering the node to be a source and broadcast the tree topology to other nodes in the network. In such a distributed approach, each node must be provided network topology information to allow computation of the tree topologies.

Alternatively still, the tree topologies may be computed at a single central site and thereafter transmitted to the network nodes. Alternatively still, hybrid approaches involving certain aspects of the above-mentioned distributed and centralized approaches may also be used.

FIGS. 1A, 1B, 3–3B and 6–7 are a series of flow diagrams showing the processing performed by a processing apparatus which may, for example, be provided as part of a node 12

(FIG. 1) to compute redundant tree structure for a network or alternatively, which may be provided as part of a system for planning and/or installing a network. The rectangular elements (typified by element 20 in FIG. 1A), herein denoted "processing blocks," represent computer software instructions or groups of instructions. The diamond shaped elements (typified by element 70 in FIG. 3), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Figures 1A, 1B:
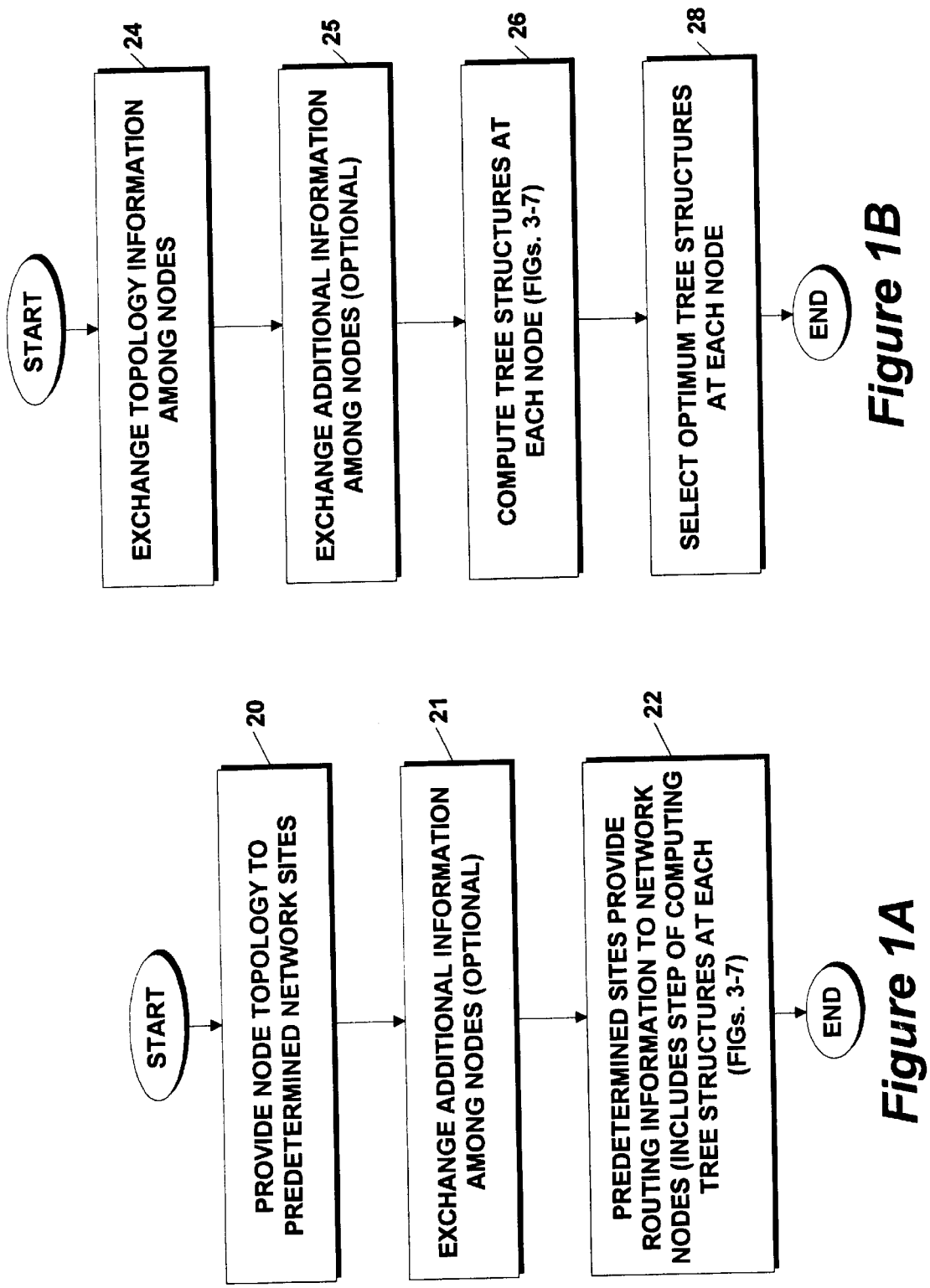
FIG. 1A is a flow diagram of a first set of processing steps which take place to provide logical connections with a tree structure to network nodes.
FIG. 1B is a flow diagram of a second set of processing steps which takes place to provide logical connections with a tree structure to network nodes.

Turning now to FIG. 1A, the processing in a system in which all node topology is sent to one or more central sites for computation of all routing paths and transmission to network nodes is shown. Processing begins in step 20 where the node topology of the network is provided to one or more predetermined network sites. Thus, all network node information can be sent to one central site where redundant tree topologies are computed in accordance with the techniques described below. Alternatively, a hybrid approach may be taken where more than one but less than all predetermined nodes generate tree topologies.

Processing then optionally proceeds to step 21 where additional information among the nodes is exchanged if necessary. Such information may include criteria or information which may be used to select optimum tree structures from a plurality of different tree structures. For example, known or expected demand or traffic in each of the nodes and/or along particular links between nodes may be exchanged between some or all of the nodes, the cost of installing or maintaining particular nodes or links, component availability projections, load balancing, reliability of paths, maximum number of nodes on a path, average number of nodes traversed by a communication sessions, symmetry of trees, separability of subtrees, maximum load on a link, capacity pre-planning, average transmission costs, etc . . . may also be exchanged between nodes.

After receiving the information, then as shown in step 22 the one or more predetermined sites provide routing information to network nodes which require the information. The routing information is computed using techniques to be described in detail below for computing tree topologies in conjunction with FIGS. 3–7.

Referring now to FIG. 1B, a flow diagram illustrating the steps to compute tree structures at individual nodes in a network is shown. Processing begins at step 24 in which all nodes exchange network topology information. Such a step may be accomplished in an existing network by transmitting the topology information to all nodes in the network using a network broadcast. Alternatively, the information may be transmitted among the nodes via so-called point-to-point transmission techniques.

Processing then proceeds to optional step 25 where any additional information among the nodes can be exchanged. Such additional information may include but is not limited to, known or expected traffic in each of the nodes and/or along particular links between nodes, component availability projections, load balancing, reliability of paths, maximum number of nodes on a path, average number of nodes traversed in a communication session, symmetry of trees, separability of trees, maximum load on a link, capacity pre-planning and average transmission costs, etc . . . . Other considerations may also play a role in the design of a network such as the dollar cost of installing a node and/or a link, the dollar cost of maintaining the node and/or link, etc. . . .

In processing step 26, once each of the nodes has all of the network topology information, then redundant tree topologies for each node can be computed. Thus, each node considers itself a source and all other nodes to be included in the tree topology as possible destinations. Such computations are performed in accordance with the techniques described below in conjunction with FIGS. 3–7. In the case where a plurality of redundant tree structures are computed, then as shown in step 28 an optimum pair of redundant tree structures (according to some metric) are selected at each node. Once the pairs of redundant tree structures have been selected at each node, processing ends. This process can be performed once or repeatedly for different nodes in the network or to provide different tree topologies.

Figure 2:
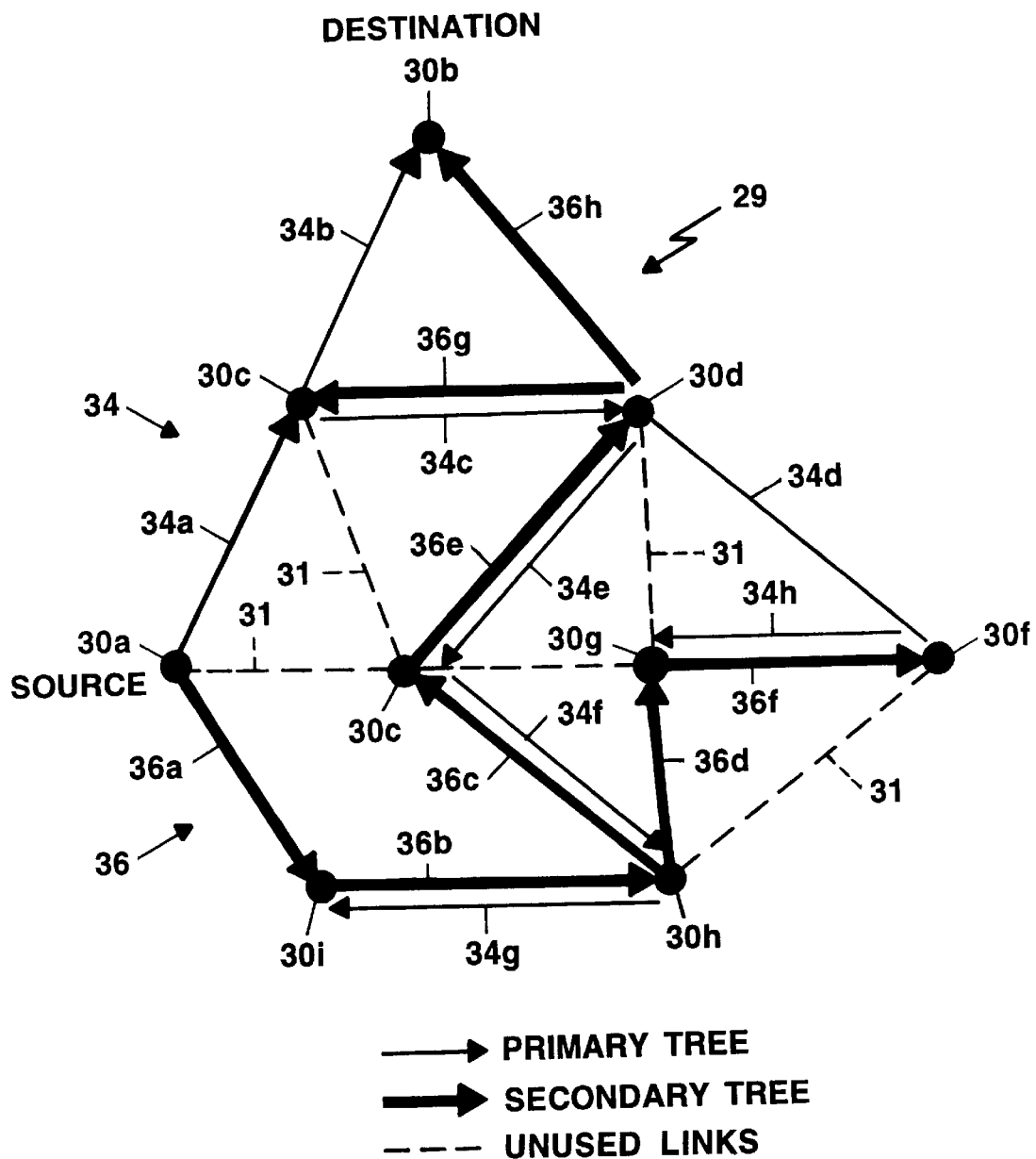
FIG. 2 is a schematic diagram illustrating the first and second trees connecting a plurality of nodes.

Referring now to FIG. 2, a network illustrated as an edge redundant graph 29 includes a source node 30a and a destination node 30b connected by a pair of redundant trees 34, 36. Tree 34 includes arcs 34a–34g coupled to respective ones of the nodes 30a–30i, as shown. Tree 36 includes arcs 36a–36f coupled as shown to respective ones of the nodes and 30c–30i. Trees 34, 36 are provided by following the process discussed below in conjunction with FIGS. 6–6B. Although the trees 34, 36 include nodes connected by arcs in two opposite directions (i.e., trees 34, 36 share edges), it should be noted that eliminating any edge does not disconnect any node from the source 30.

Figure 2A:
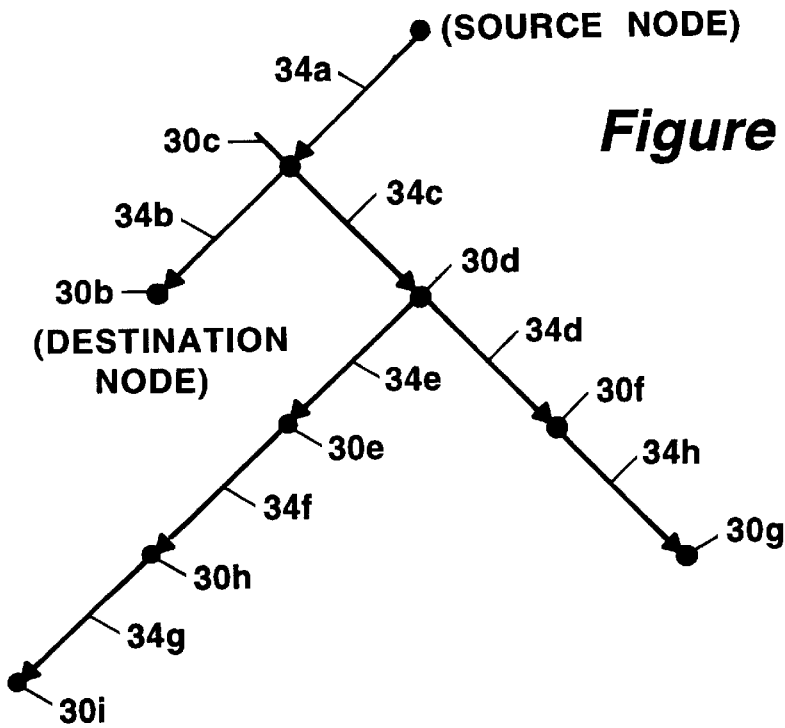
FIGS. 2A and 2B are a series of diagrammatical illustrations showing a pair of trees resultant from the connection of the plurality of nodes in FIG. 2.
Figure 2B:
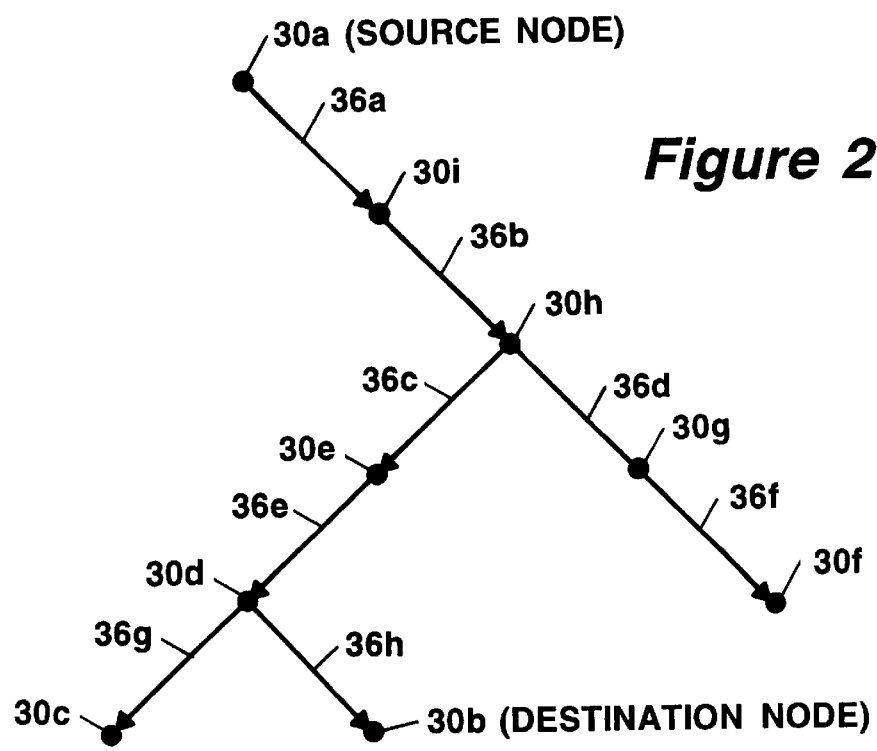

Referring briefly to FIGS. 2A, 2B the tree structures formed by the primary paths 34a–34h (FIG. 2A) and the tree structure formed by the secondary paths 36a–36g (FIG. 2B) of graph 29 (FIG. 2) are shown. As can be seen in FIG. 2A, tree 34 corresponds to a spanning tree rooted at source node 30a. After a node failure, e.g. failure of node 30d, nodes 30b, 30c remain connected to the source node 30a since they are not downstream of failed node 30d in tree 34. Nodes 30e–30i are no longer connected to the source node 30a by tree 34 since nodes 30e–30i are downstream of the failed node 30d in tree 34. Thus nodes 30b, 30c can still be connected to source node 30a by the same spanning tree 34, even though the tree 34 is no longer connected to all the nodes in the network owing to the node failure.

To restore all of the functionality to the network, the nodes downstream of the failed node 30d simply need to be re-connected to the source node 30a. Such re-connection is possible for node or edge failure as long as the undirected graph representing the network is node or edge redundant, respectively. As shown in FIG. 2B, nodes 30e–30i are upstream from failed node 30d in tree 36 and thus they remain connected to the source node 30a via tree 36 since they are not downstream of failed node 30d in tree 36.

Furthermore the redundant tree structures 34, 36 allow multicasting applications to be included in the network with relatively little effort. This is especially true when links 34, 36 are provided as fiber optic signal paths. Thus, with the techniques of the present invention, trees which facilitate multicast applications can be provided.

In operation, the redundant trees 34, 36 can be utilized by having a sender or source node make a determination that flow should be switched from a first tree (e.g. tree 34) to a second tree (e.g. tree 36). Alternatively, the redundant trees 34, 36 can be utilized by having a receiver or destination node make a determination that flow should be switched from a first tree (e.g. tree 34) to a second tree (e.g. tree 36). Alternatively still, in some applications, it may be desirable to simultaneously provide active signals on both trees 34, 36.

It should also be noted that by reversing the directions of the arcs, incast trees rather than multicast trees are provided.

Figure 3:
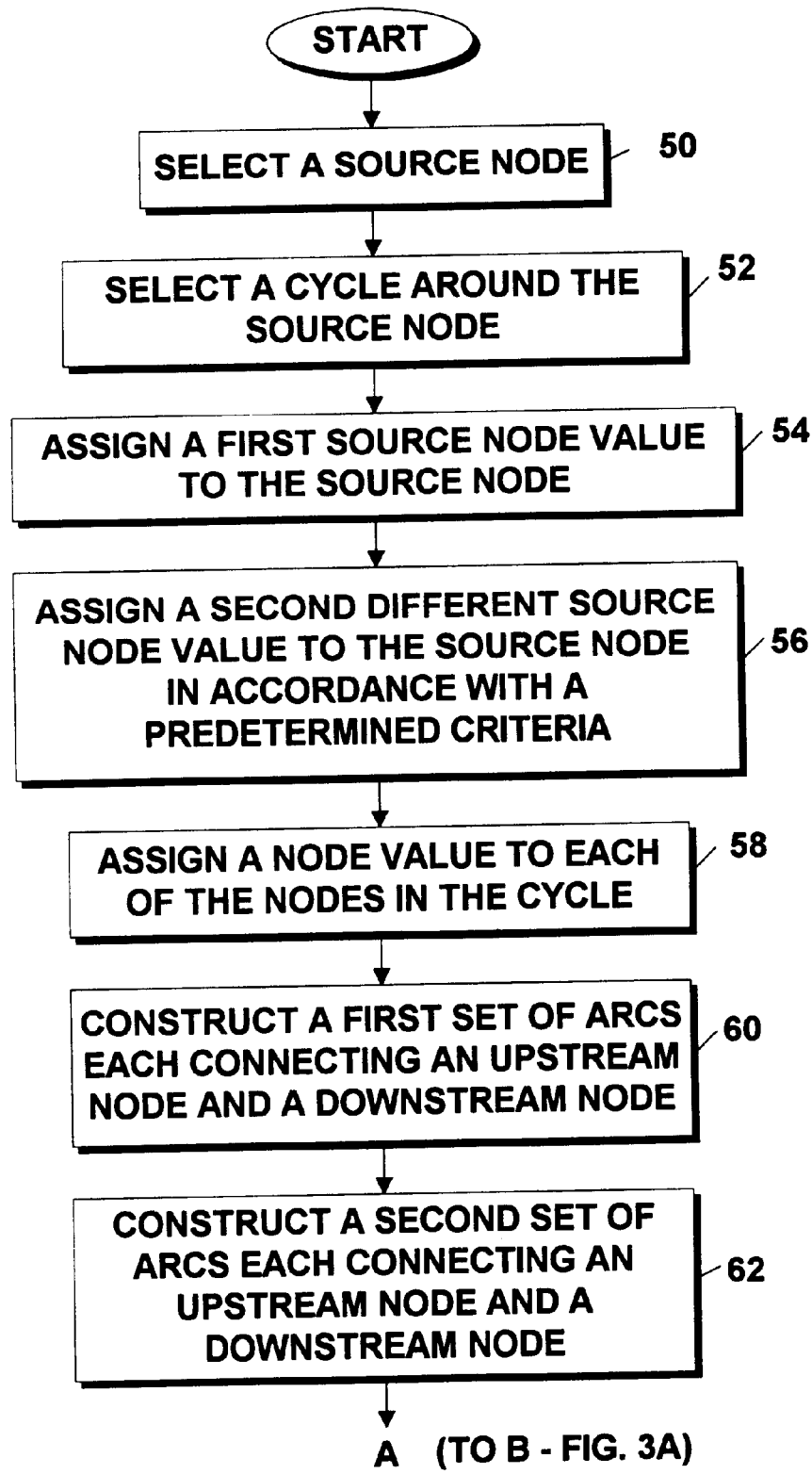
FIGS. 3, 3A, and 3B are a series of flow diagrams illustrating the steps to generate redundant trees from a node redundant graph.
Figure 3A:
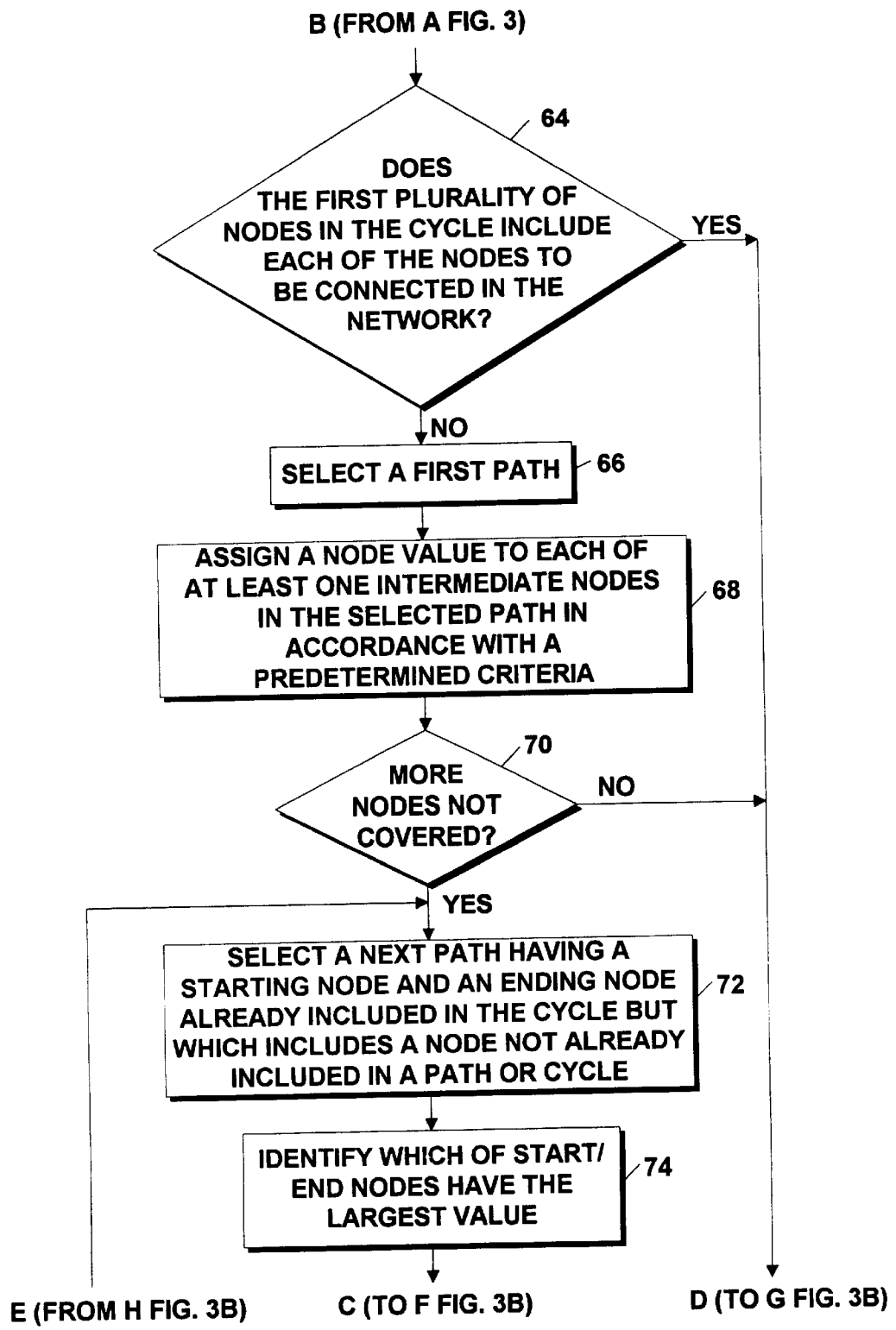
Figure 3B:
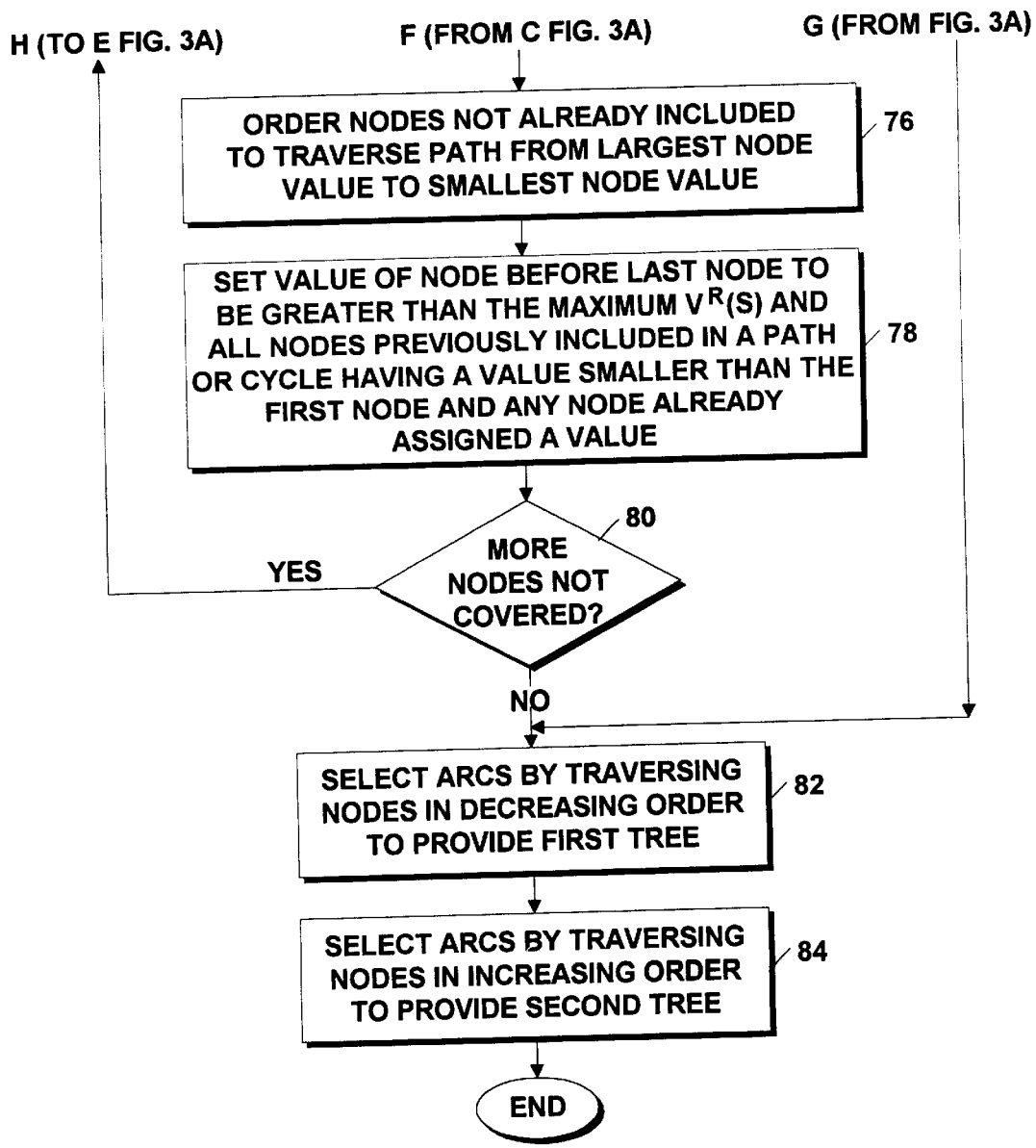

Referring now to FIGS. 3–3B, a series of flow diagrams illustrating the processing to be performed to compute a pair of redundant trees for a network which is node redundant are shown. As used herein, the phrase "node redundant network" refers to a network in which elimination of any single node does not totally inhibit communication with any other node in the network among remaining nodes. The processing shown in FIGS. 3–3B can be performed to identify tree structures in an existing network or alternatively the processing can be performed to plan a network not yet in existence. In either case the network may be represented as a node redundant undirected graph denoted as:

G(N, E)

in which:

N represents the nodes in the network; and

E represents the edges in the network.

An undirected edge refers to an unordered pair of nodes (i.e., nodes between which information flows or can be transmitted in either direction). An undirected edge will be denoted herein using the following notation:

[$n_1$, $n_2$].

Thus, an undirected edge [$n_1$, $n_2$] indicates that information can flow in either direction between node $n_1$ and node $n_2$.

A directed path is an ordered set of nodes (i.e. a path with a direction) which does not include a cycle and in which there exists an edge between two adjacent nodes within the ordered set of nodes.

A directed cycle is an ordered set of nodes in which there exists an edge between two adjacent nodes and in which there is no repetition of nodes within the set except that the first and last nodes are identical.

It should be noted that the terms "node" and "vertex" are used interchangeably herein and that an ordered pair of nodes refers to nodes between which a signal flows or is transmitted in only one direction. Such an ordered pair nodes is typically referred to as an arc. Thus, an arc from node $n_1$ to a node $n_2$ may be denoted using the following notation:

($n_1$, $n_2$).

Thus, arc ($n_1$, $n_2$) indicates that information flows from the first node $n_1$ to the second node $n_2$. Accordingly, a pair of arcs ($x_1$, $x_2$) and ($x_2$, $x_1$) are functionally equivalent to the undirected edge [$x_1$, $x_2$].

In accordance with the techniques of the present invention, for any source node S which belongs to the set of nodes N (which may be denoted as S∈ N), one can generate a first directed tree herein designated B and a second directed tree herein designated R such that, after eliminating any node (in the node redundant case) or any edge (in the edge redundant case), the source node S remains connected to all other nodes N of the network through the first tree B and/or through the second tree R even when deprived of the eliminated node or edge, respectively.

In general overview, starting with a node redundant graph G=(N, E) and a source node S, the process of the present invention includes the steps of selecting a cycle, and then subsequent paths, and ordering the node 'voltages' as they get included in the cycle or one of the paths. Two arbitrary 'voltages' designated $v^B(s)$ and $v^R(s)$, are associated with the source node S and the voltages are selected such that $v^B(s)>v^R(s)$. Reference is sometimes made herein to voltage $v^B(s)$ as v(s) in the process. The set of nodes which have already been assigned a voltage at stage j of the process are denoted as $N_j$. At each stage j of the process, a first or Blue (B) directed tree, ($N_j$ $E_j^B$) and a second or Red (R) directed tree ($N_j$ $E_j^R$) are formed, both of which span the set of nodes $N_j$.

The superscripts B, R used in the arc notation E indicates the tree to which the arc belongs. Thus $E^B$ denotes an arc in the first or Blue tree and $E^R$ denotes an arc in the second or Red tree.

The subscript j used in the arc notation E indicates the path to which the arc belongs. Thus $E_1$ denotes an arc in the first path. Hence the notation $E_1^B$ denotes an arc in the first path of the first or Blue tree while $E_1^R$ denotes an arc in the first path of the second or Red tree.

Turning now to FIG. 3, as shown in processing steps 50 and 52, processing begins by defining one of the network nodes N as a source node S and selecting a cycle containing the source node S and a plurality, here k, additional nodes denoted as $c_1, \ldots, C_k$. Then, as shown in steps 54, 56 first and second source node values are assigned to the source node in accordance with a predetermined criteria. In one particular embodiment, the criteria requires that the second source node value be less than the first source node value.

Processing then proceeds to processing block 58 where a node value is assigned to each node in the cycle. In a preferred embodiment, the node values are assigned such that each node has a value between the first and second source node values. Moreover, the node values should be assigned such that when traversing the nodes on the cycle, the node values are reached in either descending or ascending order.

Steps 50–58 may be mathematically represented as follows:

selecting a cycle (s, $c_1, \ldots, C_k$, s) in the graph G with k≧2 where k corresponds to the number of nodes in the cycle excluding the source node.

Expressing the set of nodes {s, $c_1, \ldots, C_k$} as $N_1$, the nodes can be ordered as shown in Equation 1 below:

$$v^B(s)>v(c_1)> \ldots v(c_k)>v^R(s) \quad \text{Equation 1}$$

in which v(n) corresponds to the node values of the $n^{th}$ node where n corresponds to $c_1$–$c_k$;

superscript B indicates that the value is associated with the first or Blue tree topology; and superscript R indicates that the value is associated with the second or Red tree topology.

Thus as can be seen in Equation 1, the nodes are ordered in a particular manner.

Processing then flows to processing steps 60 and 62 where a first set of arcs connecting an upstream node and a downstream node and a second set of arcs connecting a down stream node and a upstream node are respectively computed.

This may be expressed as shown in Equations 2 and 3:

$$E_1^B = \{(s,c_1), (c_1,c_2), \ldots, (c_{k-1},c_k)\} \quad \text{Equation 2}$$

$$E_1^R = \{(s,c_k), (c_k,c_{k-1}), \ldots, (c_2,c_1)\} \quad \text{Equation 3}$$

in which:

E corresponds to a set of arcs;

superscript B indicates that the value is associated with the first or Blue tree topology;

superscript R indicates that the value is associated with the second or Red tree topology; and subscripts on E indicate which set of nodes have been processed (e.g. subscript 1 indicates it is the first in the respective tree).

Processing then flows to decision block 64, where a decision is made as to whether the cycle selected in step 52 includes all nodes in the graph which should be connected. It should be noted that in some applications all the nodes to be connected may fewer than all of the nodes in the graph. That is, it may be desirable to connect a subset of all of the nodes which exist or which may exist in a network. Alternatively, it may not be possible to connect all nodes in a network.

If not all the nodes to be connected are included in the cycle, then processing flows to processing block 66 where a path starting on some node in the cycle is selected. The selected path passes through some set of nodes not on the cycle, and ends on another node on the cycle. At this point, the first path is being processed and thus the index j is set equal to 1 (i.e. j=1). The selected path may be expressed as shown in Equation 4 where the index j has been included:

$$\text{selected path} = (x_{j,0}, x_{j,1}, \ldots x_{j,Lj}) \quad \text{Equation 4}$$

in which $x_{j,0}$ corresponds to the starting node on the $j^{th}$ path;

$x_{j,1}$ corresponds to the second node on the $j^{th}$ path; and $x_{j,Lj}$ corresponds to the number of nodes on the $j^{th}$ path.

It should be noted that the selected path should include at least two nodes (i.e. $L_j$ should be provided having a value greater than or equal to two), the starting and ending nodes $x_{j,0}$ and $x_{j,Lj}$ respectively in the path should belong to the set of nodes which have already been assigned a value with the node value of the starting node $x_{j,0}$ being greater than the node value of the ending node $x_{j,Lj}$.

This may be expressed mathematically as:

$$x_{j,0} \in N_{j-1}$$

$$x_{j,Lj} \in N_{j-1}$$

$$v(x_{j,0}) > v(x_{j,Lj})$$

Processing then flows to step 68 where the nodes in the selected path which do not already have a value are assigned a value in accordance with a predetermined criteria. This may be accomplished by adding the new nodes to the set of nodes which have already been assigned a value at a previous stage in the processing and then ordering the nodes in accordance with the predetermined criteria.

This may be expressed as shown in Equations 5 and 6, respectively:

$$N_j = N_{j-1} \cup \{x_{j,1}, \ldots, x_{j,Lj-1}\} \quad \text{Equation 5}$$

$$v(x_{j,0}) > v(x_{j,1}) > \ldots > v(x_{j,Lj-1}) > v_{max} \quad \text{Equation 6}$$

where $$v_{max} = \max [v^R(s), \max[v(y):v(y)<v(x_{j,0})]]$$

in which $y \in N_{j-1}$; and $v(y)<v(x_{j,0})$ indicates all node values having a value less than the value of node $x_{j,0}$.

If in decision block 70 decision is made that the cycle and path above do not include all nodes of the graph, then processing proceeds to steps 72–78 and another path is again constructed starting on some node already included, passing through one or more nodes not included, and then ending on another already included node. Counter j is then incremented.

In processing block 74, the node value of the starting node on the path is compared to the value of the ending node on the path and the node having the largest value is identified. Processing then proceeds to processing block 76 where the nodes not already included are ordered such that the path can be traversed from the node having the largest value to the node having the smallest value.

Processing then proceeds to step 78 where the value of the node adjacent the starting or ending node on the path having the largest value is set to be the greater of: (1) the maximum on the node value of the source node on the red tree and (2) all nodes previously included in a path or cycle having a value smaller than the first node and any node already assigned a value.

Decision block 80 implements a loop to continue the processing in steps 72–78 such that the technique continues to add new nodes until all nodes which are desired to be included are included.

If a decision is made in decision block 80 that all nodes which should be included have been included, then processing proceeds to steps 82 and 84 where arcs are selected by traversing nodes in decreasing and increasing orders, respectively, to provide the first and second trees, respectively.

The steps outlined above specify a particular ordering of nodes without assigning specific numerical values or 'voltages' to associate with the nodes (since these values are only of use in seeing the analogy and not in establishing directions). Based on this ordering, the process incrementally builds the network tree topology.

This particular way of ordering nodes has the convenient feature that the new nodes at each new path are entered all together into the previously ordered set. It is also recognized that the dominant computational task is simply finding the cycle and the subsequent paths. It is simplest to search for an arbitrary path, and then reorder it if need be. Choosing the cycle and paths in different ways can yield a variety of different tree structures. For example, unbalanced trees with long individual paths or balanced trees with short paths, will become clearer below, depending on particular requirements and criteria. Such criteria might include in a communications network minimum distortion or minimum delay. In a power network (e.g. a power distribution grid), on the other hand, such criteria might include a minimum resistance. Still in other types of network, other criteria appropriate to the network would be used.

Figure 4A:
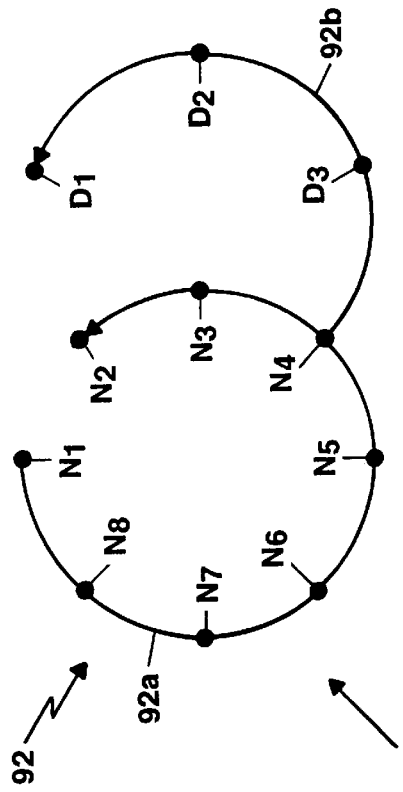
FIGS. 4, 4A, and 4B are a series of diagrams illustrating selection of a cycle in a graph.
Figure 4B:
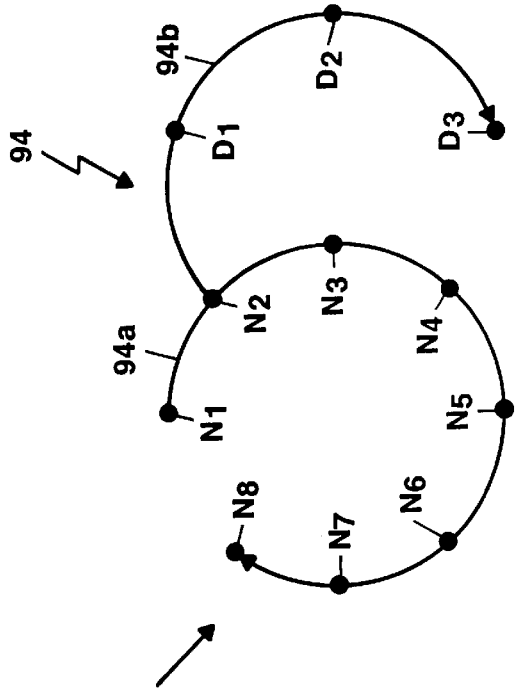
Figure 4:
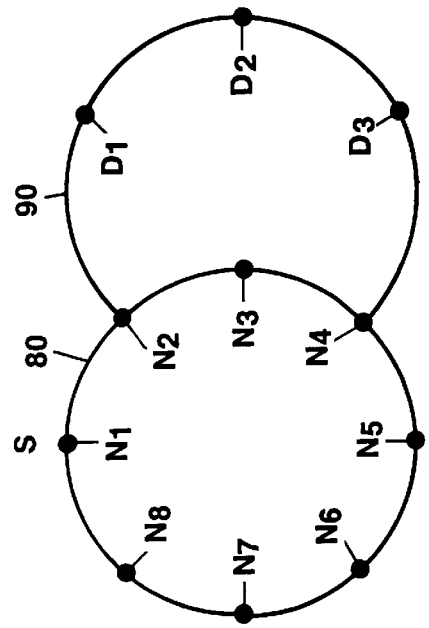

Referring now to FIG. 4, an example of the selection of a cycle and a path are shown. A cycle 88 includes nodes $N_1$–$N_8$ with node $N_1$ designated as a source node. A path 90 beginning and ending on the cycle 88 includes nodes $D_1$–$D_3$.

It should be noted that in a node redundant graph, the selection of cycles and paths is made such that a cycle containing the source node $N_1$ exists and that for any such cycle, a path can be added as described above in conjunction with FIGS. 3–3B. Subsequent such paths can be added, in arbitrary ways in compliance with some preselected criteria, until all nodes to be connected are included in a cycle or a path.

Care must be taken in selection of cycles and paths since it is possible to select cycles and paths which do not result in the desired redundant tree structures. That is, it is possible to select cycles and paths such that failure of a single node may leave a destination node disconnected. In accordance with the techniques of the present invention, however, appropriate selection of cycles and paths is guaranteed by appropriated ordering of nodes.

For example, selection of cycle 88 and path 90 can result in generation of a first tree 92 (FIG. 4A) and a second tree 94 (FIG. 4B). As illustrated in FIGS. 4–4B, tree structures 92, 94 result in redundancy such that all nodes can be reached from source node $N_1$ by one of the trees 92, 94. It should be noted, however that other tree topologies can be generated based on the same cycle and path, so that failure of a node or link does not leave all remaining nodes connected to the source node. For example, if the directions of paths 92a (FIG. 4A) and path 94a (FIG. 4B) are reversed, then failure of node $N_3$ or failure of the link between nodes $N_2$ and $N_3$ results in a situation where the nodes $D_1$, $D_2$, and $D_3$ on paths 92b, 94b are disconnected from the source node $N_1$.

Appropriate selection of a direction for the cycle 88 and path 90, allows selection of a first tree 92 following a first direction around the cycle 88 and path 90 and selection of a second tree 94 following a second opposite direction around the cycle 88 and path 90. Thus, the technique of the present invention allows selection of directions for cycles 88 and paths 90 which lead to the provision of pairs of redundant tree structures such as tree structures 92, 94.

Assigning directions to the cycles and paths may be thought of in terms of the following analogy. A source node is provided as a voltage source and each edge of the cycle and any added paths corresponds to a resistor having a predetermined resistance value (removing all other edges of the original graph from consideration). The directions around the cycle and path then correspond to the direction in which current would flow. The nodes are ordered in terms of node voltages assigned thereto with the source node S having two voltages (one on each side of the battery) assigned thereto.

Continuing with the analogy, selecting different resistor values can sometimes lead to different directions of current flow. Any such set of directions will yield network topologies having a least first and second tree structures B and R with the desired properties. In many cases more than one pair of tree topologies can be identified and steps can be taken to select preferred topologies. This corresponds to selecting these possible sets of directions for current flow.

Figure 5A:
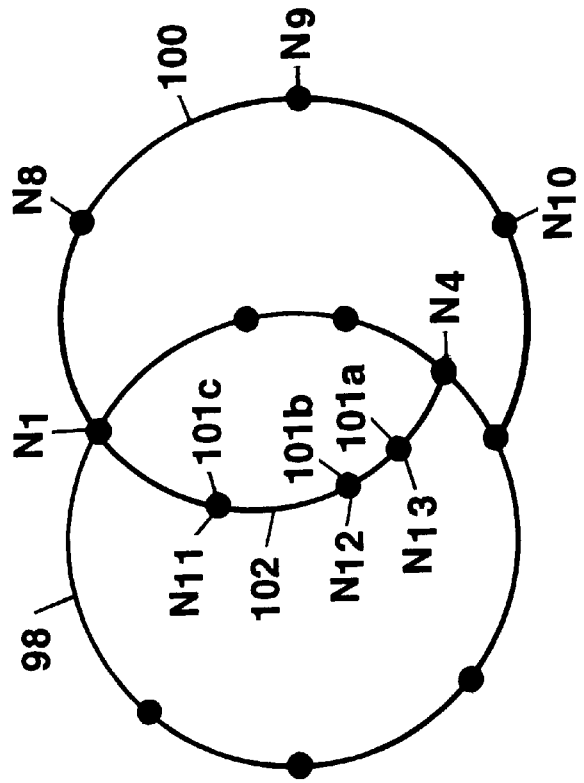
FIGS. 5, 5A, and 5B are a series of diagrams illustrating the assignment of node voltages in a graph.
Figure 5:
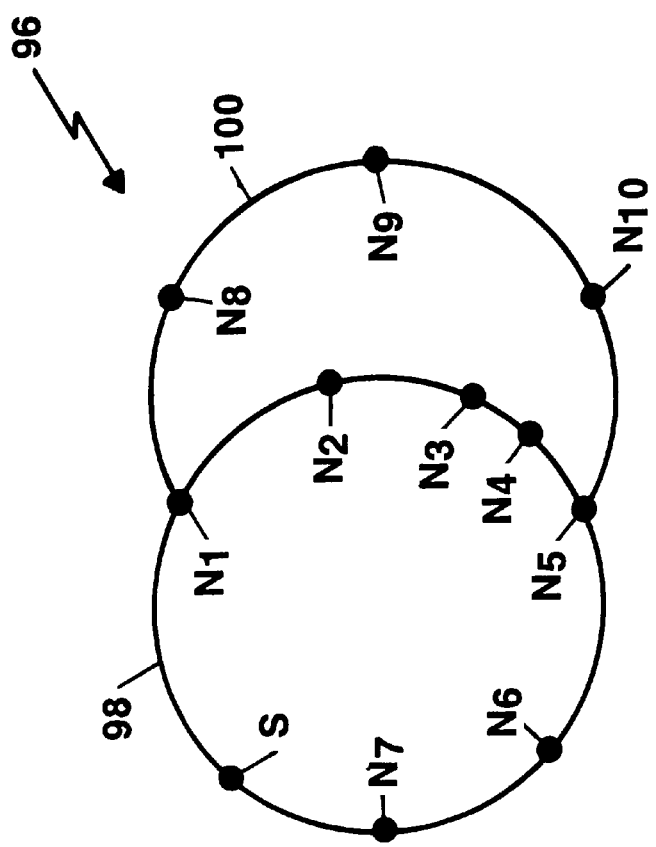
Figure 5B:
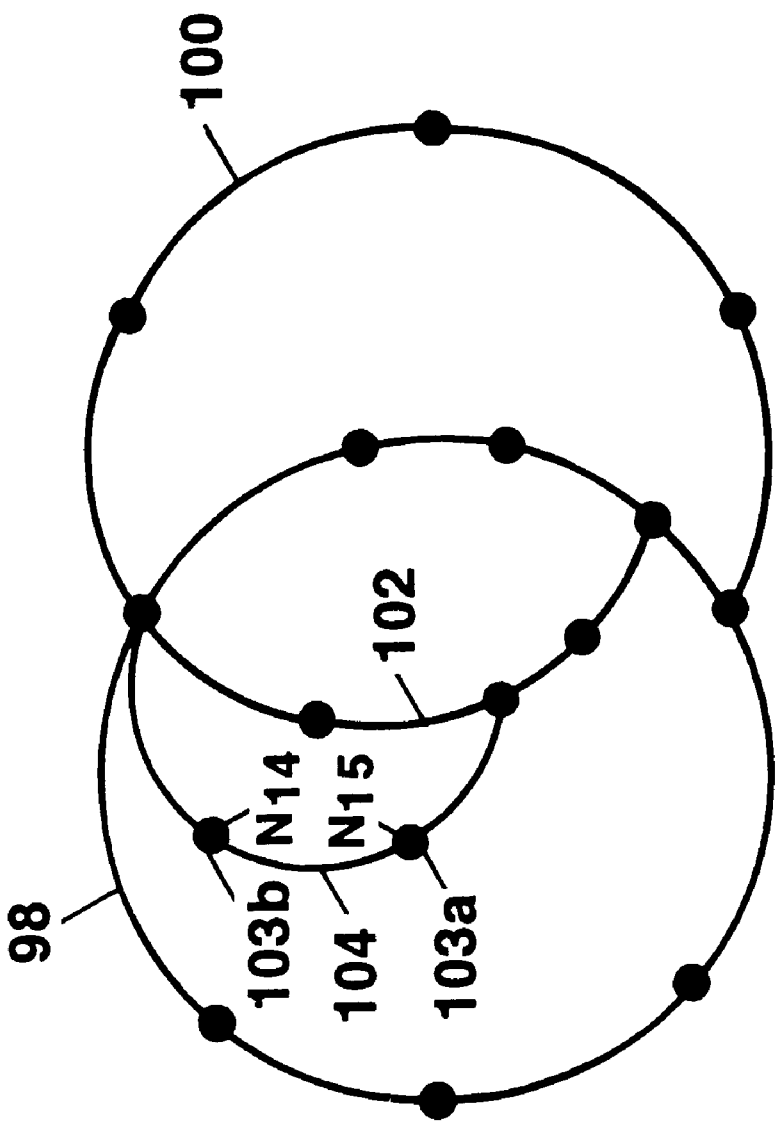

Referring now to FIGS. 5–5B, a series of diagrams illustrating the assignment of node values are shown. A cycle 98 includes a source node S and a plurality of intermediate nodes $N_1$–$N_7$. Once cycle 98 is selected, source node S may be assigned a first and second source node values. For example, source node S may be assigned a first value of one hundred and a second value of zero. Each of the nodes $N_1$–$N_7$ may then be assigned a value in accordance with a predetermined criteria.

Alternatively, rather than assigning node values after immediately selecting a cycle or a path, all cycles and paths may first be selected. For example, after selecting cycle 98 a path 100 beginning on node $N_1$, ending on node $N_5$ and including nodes $N_8$–$N_{10}$ may first be generated and then node values assigned to nodes $N_1$–$N_{10}$.

For ease of explanation, in this particular example, node values will be assigned as nodes are included in added paths. Those of ordinary skill in the art will appreciate, however, that all the paths to be described below could first be selected and then once all the nodes to be included in the network are included in a cycle or a path, node values could be assigned. Alternatively still, a combination of cycle and path selection and node assignment values may also be used.

With the source node assigned a first value of 100 and a second value of zero, nodes $N_1$–$N_7$ may be assigned the value shown in Table 1 below.

TABLE 1

| Node | Node Values |
|---|---|
| S | 100, 0 |
| $N_1$ | 90 |
| $N_2$ | 80 |
| $N_3$ | 70 |
| $N_4$ | 60 |
| $N_5$ | 50 |
| $N_6$ | 40 |
| $N_7$ | 30 |

Next, path 100 is selected to include nodes $N_8$, $N_9$ and $N_{10}$. In accordance with the technique of the present invention, these nodes are assigned values which are between the starting and ending nodes of the path 100. Thus, in this particular example, the staring node $N_1$ has been assigned a value of ninety (90) and the ending node $N_5$ of the path 100 has been assigned a value of fifty (50). Thus, nodes $N_8$, $N_9$, and $N_{10}$ should be assigned node values between the values of ninety (90) and fifty (50). The possible node values to select from are further limited in that node $N_2$ has a value of eighty (80) and new node values must have an value greater than eighty (80) and less than ninety (90). Thus, one possible selection of node values is that shown in Table 2.

TABLE 2

| Node | Node Value |
|---|---|
| $N_8$ | 88 |
| $N_9$ | 86 |
| $N_{10}$ | 84 |

Thus, upon assignment of the node values, an ordered set of nodes $N_1$–$N_{10}$ in network 96 is provided. From this ordered set of nodes, a pair of trees similar to trees 92 (FIG. 4A) and 94 (FIG. 4B) may be generated.

Referring now to FIG. 5A, additional nodes $N_{11}$–$N_{13}$ are included in a path 102. Path 102 begins on node $N_1$, ends on node $N_4$ and includes nodes $N_{11}$–$N_{13}$. Thus, nodes $N_{11}$–$N_{13}$ must be assigned node values which are between the values of node $N_1$ and node $N_4$. Furthermore, the node values assigned to node values $N_{11}$–$N_{13}$ can be no greater than the node value of the starting node on the path and can be no less than the largest node value already included on any cycle or path. For example, nodes $N_1$–$N_{10}$ are already included in a previous cycle or path. Thus, appropriate node values for nodes $N_{11}$–$N_{13}$ are shown in Table 3 below.

TABLE 3

| Node | Node Value |
|---|---|
| $N_{11}$ | 89.8 |
| $N_{12}$ | 89.6 |
| $N_{13}$ | 89.4 |

It should be noted that assignment of such node values again results in an ordered set of nodes $N_1$–$N_{13}$.

Referring now to FIG. 5B, a third path 104 beginning on node $N_1$, ending on node $N_{12}$ and including nodes $N_{14}$, $N_{15}$ is shown. Thus, the nodes $N_{14}$ and $N_{15}$ must be assigned values between the values assigned to nodes $N_1$ and $N_{12}$ and must also satisfy the condition that they are greater than the node values of any other node already included in a cycle or a path. Thus, appropriate node values for nodes $N_{14}$ and $N_{15}$ are shown below in Table 4.

TABLE 4

| Node | Node Value |
| --- | --- |
| $N_{14}$ | 89.98 |
| $N_{15}$ | 89.96 |

Thus, nodes $N_1$–$N_{15}$ are now provided as an ordered set of nodes. It should be noted that it is not necessary that certain nodes have different values. For example, nodes $N_2$ and $N_3$ may be assigned like node values since no path begins or ends on either of these nodes.

Figure 6:
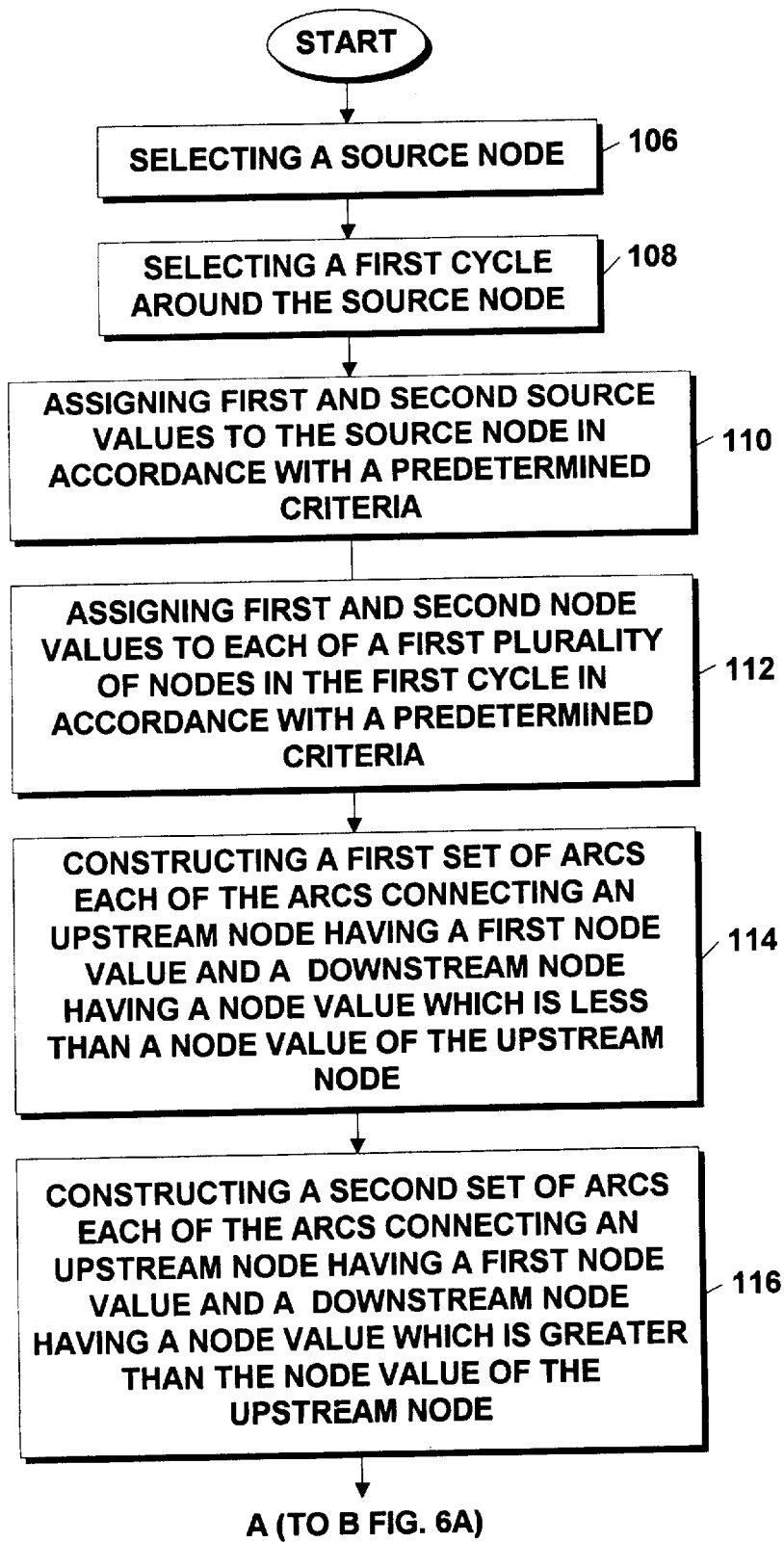
FIGS. 6, 6A, and 6B are a series of flow diagrams illustrating the steps to generate redundant trees from an edge redundant graph.
Figure 6A:
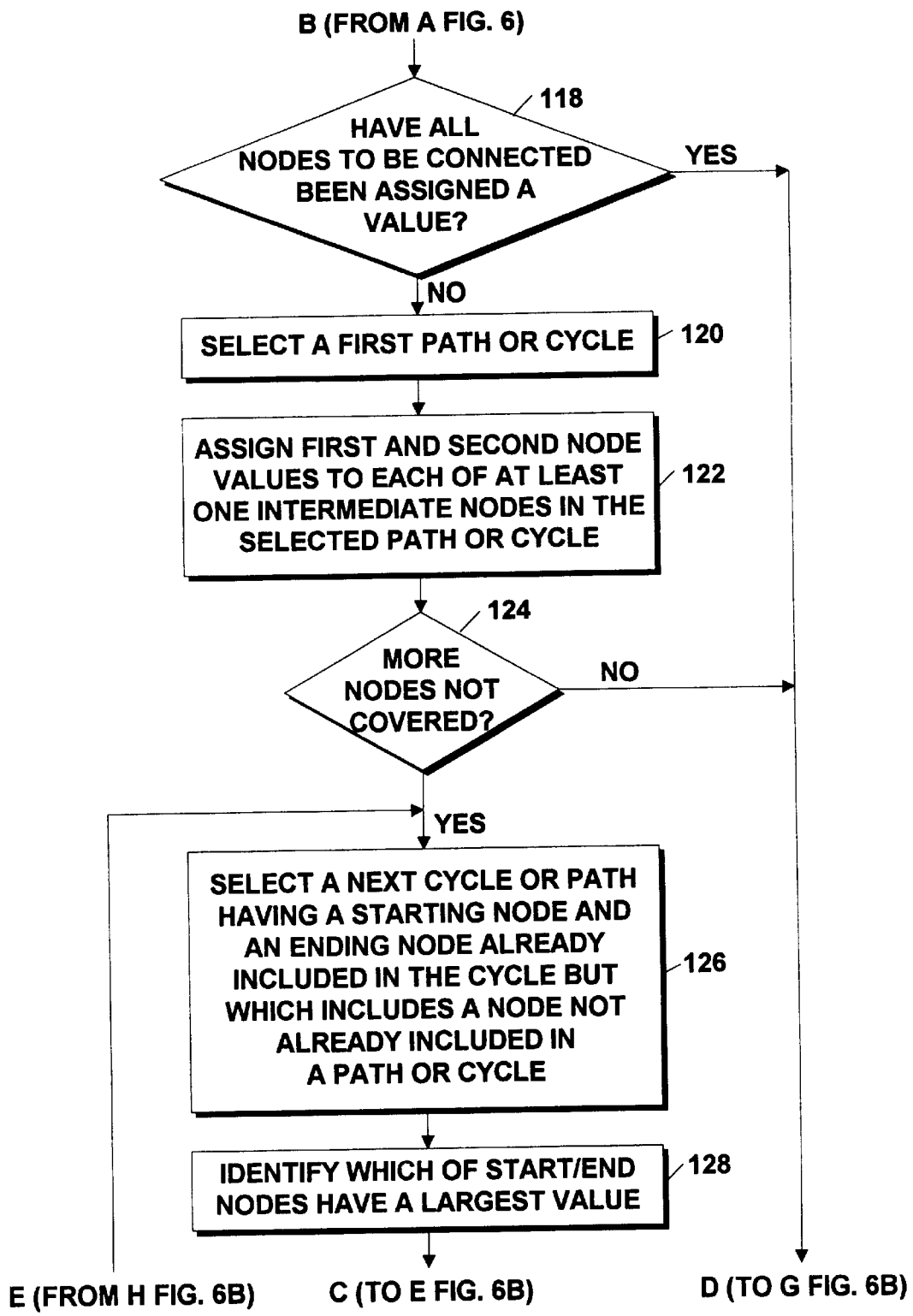
Figure 6B:
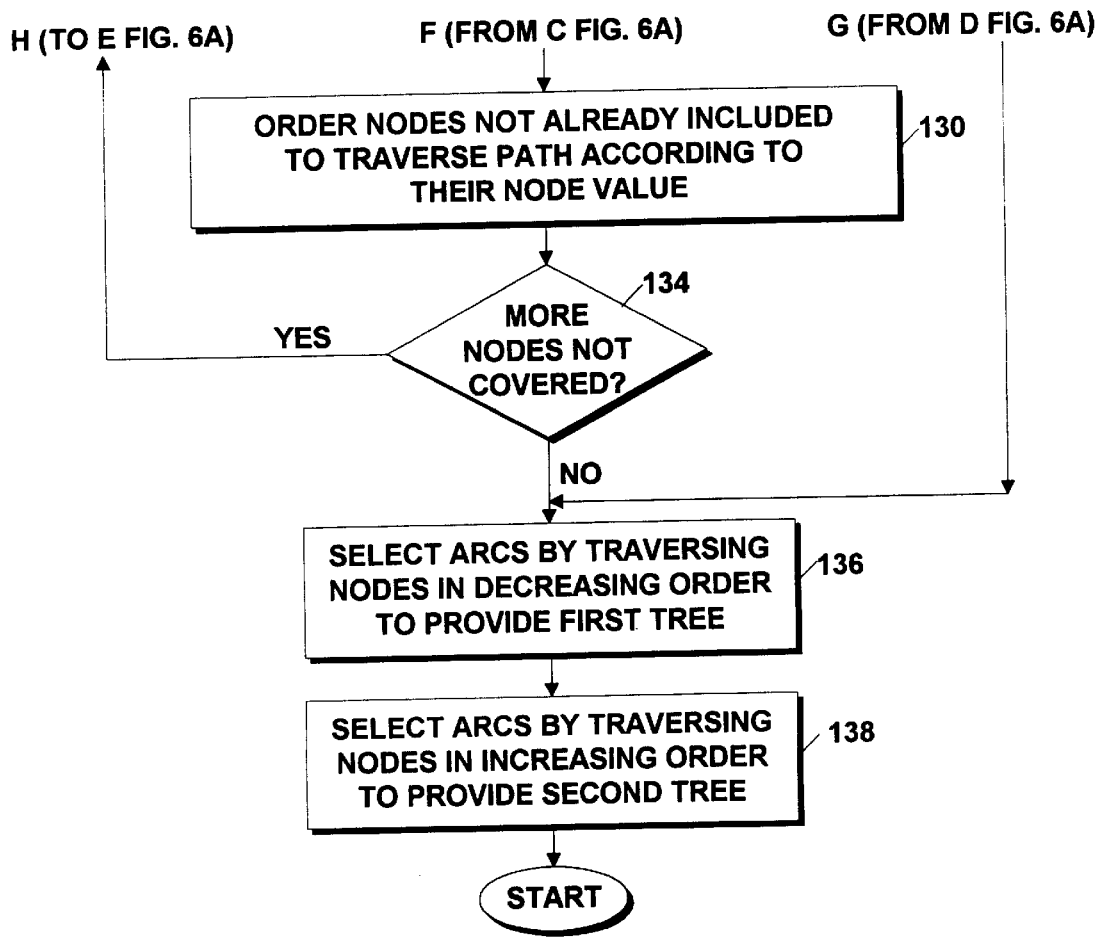

Referring now to FIGS. 6–6B, the process steps to provide a pair of redundant trees for switch protection for link failure are shown. Processing in FIGS. 6–6B assumes that an edge redundant graph is being processed. Unless otherwise defined differently hereinbelow, the notation used in conjunction with FIGS. 6–6B is the same as that explained above in conjunction with FIGS. 3–3B.

In general overview, starting with an edge graph G=(N, E) and a source node S, the process of the present invention selects a cycle, and then subsequent paths, and also orders the node 'voltages' as they get included in the cycle or one of the paths. Two arbitrary 'voltages' designated $v^B(s)$ and $v^R(s)$, are associated with the source node S and the voltages are selected such that $v^B(s) > v^R(s)$. During the processing of the edge redundant graph G, each of the nodes is assigned a first or blue node value and a second or red node value. The set of nodes which have already been assigned a voltage at a stage j of the process are denoted as $N_j$. At each stage j of the process, a first or Blue (B) tree, $(N_j, E_j^B)$ and a second or Red (R) tree $(N_j, E_j^R)$ are formed, both of which span the set of nodes $N_j$.

The steps discussed above in conjunction with FIGS. 3–3B, for node failure protection do not provide a pair of redundant tree structures for the case where a link failure is considered, because it is not always possible at a stage $j \geq 2$ to find paths as described above in conjunction with FIGS. 3–3B. Sometimes, it is necessary to find a cycle that leaves the set of nodes $N_{j-1}$ on one node and returns to the same node, i.e. with $x_{j,0} = x_{j,Lj}$. This can be handled by letting each node x have two 'voltages,' $v^B(x)$ and $v^R(x)$ associated with it. Thus, the ordering described above in process steps 58, 68 and 76 are modified by ordering the nodes in accordance with the criteria of Equation 7.

$$v^B(s) > v^B(c_1) > v^R(c_1) > v^B(c_2) > v^R(c_2) > \ldots > v^B(c_k) > v^R(c_k) > v^R(s) \qquad \text{Equation 7}$$

Turning now in more detail to FIGS. 6–6B, processing begins in steps 106, 108 with selection of a source node S and a cycle containing the source node S and k additional nodes $c_1, \ldots, c_k$. Then, as shown in step 110 first and second source node values are assigned to the source node in accordance with a predetermined criterion. In one particular embodiment, the criteria requires that the second (or red) source node value be less than the first (or blue) source node value.

Processing then proceeds to processing block 112 where first and second node values are assigned to each node in the cycle. In a preferred embodiment, the node values are assigned such that the first and second node values assigned each node are between the first and second source node values. Moreover, the node values should be assigned such that when traversing the nodes on the cycle, the first or blue node values are reached in either descending or ascending order.

Steps 106–112 may be mathematically represented as follows:

selecting any cycle $(s, c_1, \ldots, c_k, s)$ in the graph G with $k \geq 2$ where k corresponds to the number of nodes in the cycle excluding the source node.

Expressing the set of cycle nodes $\{s, c_1, \ldots, c_k\}$ as $N_1$, the nodes can be ordered as shown in Equation 7 above and repeated here for convenience:

$$v^B(s) > v^B(c_1) > v^R(c_1) > v^B(c_2) > v^R(c_2) > \ldots > v^B(c_k) > v^R(c_k) > v^R(s) \qquad \text{Equation 7}$$

in which v(n) corresponds to the node values of the $n^{th}$ node where $n = c_1 - c_k$;

superscript B indicates that the value is associated with the first or Blue tree topology; and superscript R indicates that the value is associated with the second or Red tree topology.

Thus as can be seen in Equation 7, the nodes are ordered in a particular manner.

Next, as shown in processing steps 114 and 116 where first and second sets of arcs are constructed. Each of the arcs in the first set link an upstream node having a first node value and a downstream node having a node value which is less than a node value of the upstream node. Each of the arcs in the second set connect an upstream node having a first value and a downstream having a node value which is greater than a node value of the upstream node. This results in an ordered set of nodes which are connected by arcs.

This may be expressed as shown in Equations 8 and 9:

$$E_1^B = \{(s,c_1), (c_1,c_2), \ldots, (c_{k-1},c_k)\} \qquad \text{Equation 8}$$

$$E_1^R = \{(s,c_k), (c_k,c_{k-1}), \ldots, (c_2,c_1)\} \qquad \text{Equation 9}$$

in which the notation is the same as that described above in conjunction with FIGS. 3–3B.

In decision block 118, a determination is made as to whether all nodes to be connected have been assigned node values (i.e. were all desired nodes included in the cycle). If all nodes were included in the cycle, then processing proceeds to steps 136, 138 where arcs are selected by traversing nodes in decreasing and increasing order, respectively, to provide the first and second trees.

If all nodes have not been assigned a value, then steps 120, 122 and 124 are performed to ensure that each node to be connected are assigned a node value. It should be noted that in some applications, all nodes to be connected may be fewer than all nodes included in the graph. That is, it may be desirable to connect a subset of all of the nodes which exist or which may exist in a graph representing a network.

As shown in step 120, a first path or cycle including one or more intermediate nodes is selected and processing proceeds to step 122 where first and second node values are assigned to each of the at least one intermediate nodes in the selected path or cycle. In decision block 124, a decision is made that if all nodes are covered (i.e. all nodes have been included in a path or cycle) then processing proceeds to steps 136, 138 as described above. Otherwise, if all nodes are not covered then processing proceeds to processing step 126 where a next path having a starting node and an ending node already included in the cycle but which includes a node not already included in a previous path or cycle is selected. This may be expressed as shown in Equation 10:

selected path or cycle=$(x_{j,0}, x_{j,1}, \ldots x_{j,Lj})$  Equation 10 in which $x_{j,0}$ corresponds to the starting node on the $j^{th}$ path;

$x_{j,1}$ corresponds to the second node on the $j^{th}$ path; and $x_{j,Lj}$ corresponds to the number of nodes on the $j^{th}$ path.

It should be noted that for a path the following conditions should be met: (1) at least three nodes should be included (i.e. the quantity Lj should be provided having a value greater than or equal to two), (2) the starting and ending nodes $x_{j,0}$ and $x_{j,Lj}$ respectively in the path should belong to the set of nodes which have already been assigned a value and (3) the first (or blue) node value of the starting node $x_{j,0}$ should be greater than the first (or blue) node value of the ending node $x_{j,Lj}$.

This may be expressed mathematically as:

$$x_{j,0} \in N_{j-1}$$

$$x_{j,Lj} \in N_{j-1}$$

$$v^B(x_{j,0}) > v^B(x_{j,Lj})$$

For a cycle on the other hand, the following conditions should be met: (1) at least four nodes should be included (i.e. $L_j$ should be provided having a value greater than or equal to three) and (2) the starting and ending nodes $x_{j,0}$ and $x_{j,Lj}$ are the same node and should belong to the set of nodes which have already been assigned a value.

This may be expressed mathematically as:

$$x_{j,0} = x_{j,Lj} \in N_{j-1}$$

$$v^B(x_{j,0}) = v^B(x_{j,Lj})$$

Processing then flows to step 128 where the beginning and ending nodes on each of the paths having the largest value of the first and second values are identified.

Processing then flows to step 130 where the nodes in the selected path which do not already have a value assigned thereto are assigned a value in accordance with predetermined criteria. This may be accomplished by adding the new nodes to the set of nodes which have already been assigned a value and at a previous stage in the processing and then ordering the nodes in accordance with the predetermined criteria. The nodes are ordered such that the path or cycle in which the nodes are included may be traversed according to the node values.

This may be expressed as shown in Equations 11 and 12, respectively:

$$N_j = N_{j-1} \cup \{x_{j,1}, \ldots, x_{j,Lj-1}\}$$  Equation 11

$$v^B(x_{j,0}) > v^B(x_{j,1}) > v^R(x_{j,1}) > v^B(x_{j,2}) > v^R(x_{j,2}) > \ldots > v^B(x_{j,Lj-1}) >$$
$$v^R(x_{j,Lj-1}) > v_{max}$$  Equation 12 where $v_{max}$=is the maximum of $v^B(y) < v^B(x_{j,0})$ and $v^R(y) < v^B(x_{j,0})$ where $y \in N_{j-1}$.

Processing then proceeds to decision block 134 where a decision is made as to whether all nodes to be included in the network have been included. If more nodes must be included, then processing flows back to step 126 and steps 126, 128 and 130 are repeated until all nodes are included in a cycle or path and are assigned values.

In decision block 134, if decision is made that all nodes have been covered, then processing proceeds to steps 136 and 138 where arcs are selected by traversing nodes in decreasing order to provide a first (or Blue) tree and arcs are selected by traversing nodes in an increasing order to provide the second (or Red) tree. This results in a network having nodes logically connected via first and second redundant tree topologies.

Figure 7:
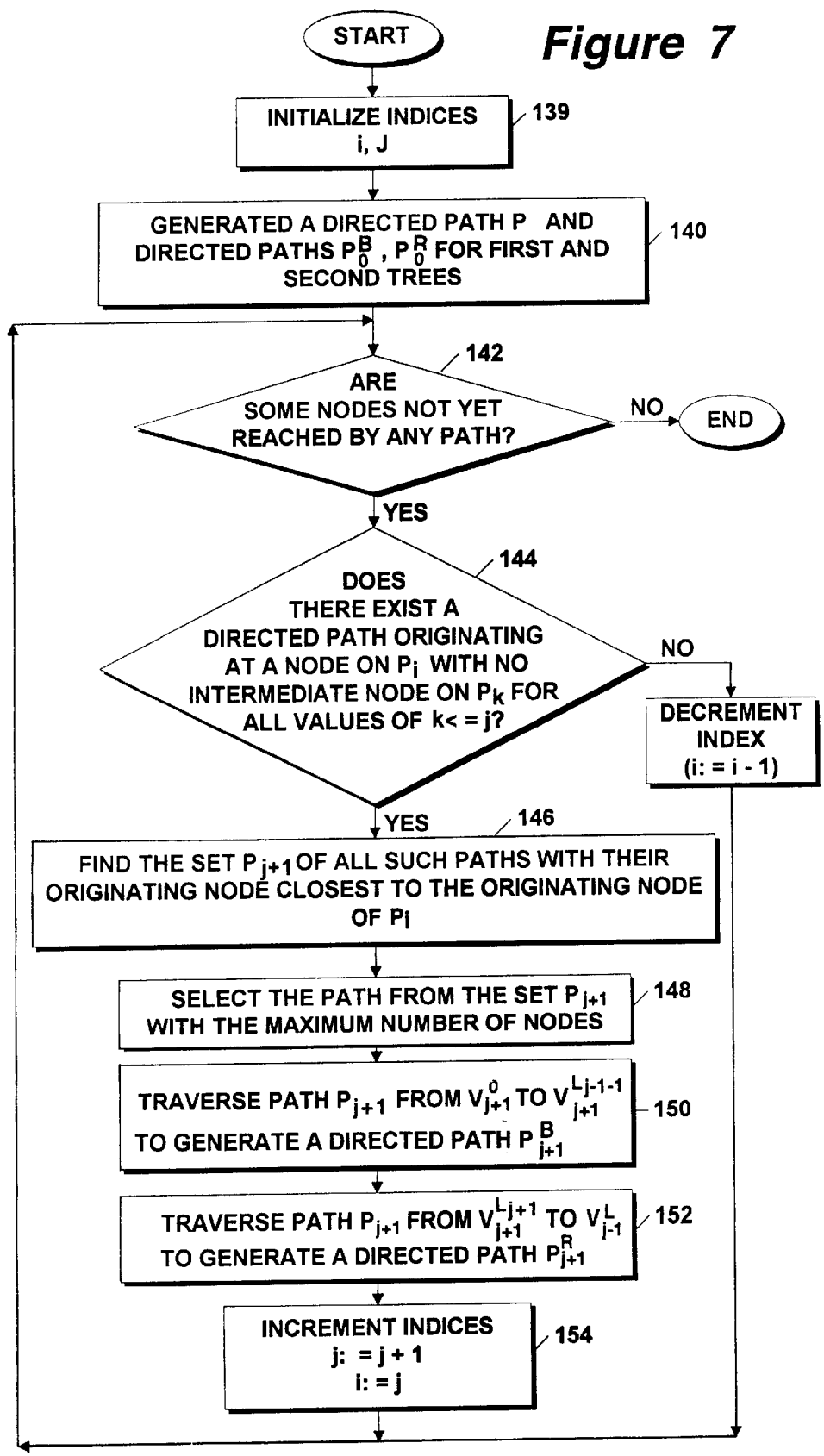
FIG. 7 is a flow diagram illustrating the steps to generate to a limited number of trees from an edge redundant undirected graph.

Referring now to FIG. 7, a flow diagram illustrating the steps to select a pair of redundant trees using a predetermined criteria are shown. In this particular example, optimum trees based on a longest path criteria are selected. It should be noted, however, that trees may be selected to optimize any criteria including but not limited to load balancing, path costs, reliability of paths, maximum number of nodes on a path, average number of nodes traversed by a communication session, symmetry of trees, separability of sub-trees, maximum load on a link and average transmission costs.

Considering an edge redundant undirected graph G(V, E) whereby edge redundant indicates that eliminating any one single edge from the set of edges E leaves the graph nodes mutually connected. From the graph E a digraph G'(N, A) is constructed where the set of arcs A is constructed from edges E by replacing each edge $[v_1, v_2]$ by the arcs $(v_1, v_2)$ and $(v_2, v_1)$. For any source node S belong to the set of nodes N two directed trees identified as blue tree B and red tree R may be generated such that after eliminating any pair of arcs $(v_1, v_2)$ and $(v_2, v_1)$ from the set of arcs A, the source node S remains connected to all nodes N of the network through the arcs of the blue and/or red trees.

Processing begins in step 139 with initialization of indices i, j. Index j corresponds to a path being generated while index i corresponds to a path which is a parent of a next path being generated (i.e. a path being examined to determine if another path will emanate therefrom).

Processing then proceeds to step 140 where a path $P_0$ (i.e. j=0) and directed paths $P_0^B$ and $P_0^R$ are generated.

As shown in step 142, a decision is made as to whether any nodes to be included are not yet reached by any paths. If a decision is made that all desired nodes have been included, then processing ends as shown.

If some nodes are not yet reached by any path, processing proceeds to step 144 where a decision is made as to whether there exists a directed path originating at a node on a path $P_j$ terminating on a node on a path $P_k$ for some k less than or equal to j and with no intermediate node on $P_k$ for all values of k less than j.

If such a directed path exists, then processing proceeds to step 146 which generates the set of paths $P_{j+1}$ within all such paths with their originating node closest to the originating node of path $P_i$. Next, processing proceeds to step 148 where a path is selected from the set of paths $P_{j+1}$ and subscript with the maximum numbers of nodes. This imposes a condition that the longest paths are selected.

Next, as shown in step 150 a directed path P is generated by traversing the path $P_{j+1}$ from $v_{j+1}^0$ until $v_{j-1}^{Lj-i-1}$. Next, processing proceeds to step 152 where a directed path $p_{j+1}^R$ is generated by traversing the path $P_{j+1}$ from $v_{j-1}^{1j+1}$ until $v_{j-1}^1$. Next, in step 154 the indices j and i are incremented and processing moves back to step 142 until all desired nodes are included in a cycle or a path. It should be noted that the value of index i may change by more than one.

As indicated heretofore, aspects of this invention pertain to specific "methods" and "method functions" implementable on computer systems. Those of ordinary skill in the art should readily appreciate that computer code defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method of establishing at least a pair of paths between a source node and a destination node in a network including a plurality of nodes, the method comprising the steps of:
   (a) selecting a source node;
   (b) selecting a cycle around the source node, wherein the cycle includes a source node a first plurality of nodes;
   (c) assigning a first source node value to the source node;
   (d) assigning a second different source node value to the source node;
   (e) assigning a node value to each of the first plurality of nodes wherein the node value assigned to each node decreases in a first direction around the cycle;
   (f) constructing a first set of arcs each of the arcs connecting an upstream node and a downstream node, the upstream node in each of the arcs having a node value which is not less than the node value of the downstream node; and
   (g) constructing a second set of arcs, each of the arcs connecting an upstream node and a downstream node, the upstream node in each of the arcs having a node value which is not greater than the node value of the downstream node.

2. The method of claim 1 further comprising the steps of:
   determining if the first plurality of nodes in the cycle includes each of the plurality of nodes in the network;
   in response to the first plurality of nodes in the cycle not including each of the plurality of nodes in the network then performing the steps of:
      (1) selecting a first path having a starting node, an ending node and at least one intermediate node wherein the starting node corresponds to one of the first plurality of nodes in the cycle, the ending node corresponds to a second different one of the first plurality of nodes in the cycle and each of the at least one intermediate nodes correspond to nodes not included in the first plurality of nodes in the cycle and wherein the value of the starting node is greater than the value of the ending node; and
      (2) assigning a node value to each of the at least one intermediate nodes wherein the node values assigned to each of the at least one intermediate nodes do not increase when traversing the first path in a direction from the starting node to the ending node.

3. The method of claim 2 wherein the step of assigning a node value to each of the at least one intermediate nodes comprises the step of:
   assigning the intermediate node immediately prior to the ending node a value which is greater than the maximum of:
      (i) the second value of the source node; and
      (ii) the value of any node included in the cycle and the path and already assigned a value which is smaller than the value of the starting node.

4. The method of claim 3 further comprising the steps of:
   constructing a first set of arcs on the first path, each of the arcs linking an upstream node and a downstream node, the upstream node in each of the arcs having a node value which is not less than the node value of the downstream node; and
   constructing a second set of arcs on the first path, each of the arcs connecting an upstream node and a downstream node, the upstream node in each of the arcs having a node value which is not greater than the node value of the downstream node.

5. The method of claim 4 wherein:
   the first source node value is greater than the second source node value; and
   a first one of the starting node and ending node corresponds to the source node and wherein in response to the source node corresponding to the starting node, the starting node is provided having the first source node value and in response to the ending node corresponding to the source node, the ending node is provided having the second source node value.

6. A method of establishing at least a pair of paths between a source node and a destination node in a network including a plurality of nodes, the method comprising the steps of:
   (a) selecting a source node;
   (b) selecting a first cycle around the source node, wherein the first cycle includes a first plurality of nodes;
   (c) assigning first and second source values to the source node;
   (d) assigning first and second node values to each of the first plurality of nodes wherein first ones of the first and second node values assigned to each node do not increase in value in a first direction around the first cycle and second ones of the first and second node values assigned to each node do not increase in value in the first direction around the first cycle and wherein for each node the first node value is greater than the second node value;
   (e) constructing a first set of arcs, each of the arcs linking an upstream node and a downstream node in the first cycle, the upstream node in each of the arcs having a node value which is not less than a node value of the downstream node; and
   (f) constructing a second set of arcs, each of the arcs connecting an upstream node and a downstream node in the first cycle, the upstream node in each of the arcs having a node value which is not greater than a node value of the downstream node.

7. The method of claim 6 further comprising the steps of:
   determining if the first plurality of nodes in the first cycle includes each of the plurality of nodes in the network;
   in response to the first plurality of nodes in the first cycle not including each of the plurality of nodes in the network then performing the steps of:
      (1) selecting a first one of a path or a second cycle;
      (2) in response to the selection of a path performing the steps of:
         (a) selecting a first path having a starting node, an ending node and at least one intermediate node wherein the starting node corresponds to one of the first plurality of nodes in the cycle, the ending node corresponds to a second different one of the first plurality of nodes in the cycle and each of the at least one intermediate nodes correspond to nodes not included in the first plurality of nodes in the cycle and wherein the first value of the starting node is greater than the first value of the ending node; and (b) assigning first and second node values to each of the at least one intermediate nodes wherein first ones of the node values assigned to each of the at least one intermediate nodes do not increase in value when traversing the path in a direction from the starting node to the ending node and wherein second ones of the node values assigned to each of the at least one intermediate nodes do not increase in value when traversing the path in a direction from the starting node to the ending node and wherein for each intermediate node the first node value is greater than the second node value;

(3) in response to the selection of a cycle performing the steps of:

(a) selecting a second cycle having a second source node and at least one intermediate node wherein the second source node corresponds to one of the first plurality of nodes in the first cycle and each of the at least one intermediate nodes correspond to nodes not included in the first plurality of nodes in the first cycle; and (b) assigning a node value to each of the at least one intermediate nodes wherein first ones of the first and second node values assigned to each of the at least one intermediate nodes do not increase in value in a first direction around the second cycle and second ones of the first and second node values assigned to each node do not increase in value in the first direction around the second cycle and wherein for each intermediate node the first node value is greater than the second node value.

8. The method of claim 7 wherein the step of assigning a node value to each of the at least one intermediate nodes comprises the step of:

assigning the intermediate node adjacent a first one of the end node and the starting node a value which is not less than the maximum of a first one of:

(i) a first one of:
the first value of all of the nodes included in the first cycle and the path having a value which is smaller than the first value of the first node in the path; and
the second value of all of the nodes included in the first cycle and the first path having a value which is smaller than the first value of the first node in the first path;

(ii) a first one of:
the first value of all of the nodes included in the first cycle and the second cycle having a value which is smaller than the value of the second source node in the second cycle; and
the second value of all of the nodes included in the first cycle and the second cycle having a value which is smaller than the first value of the second source node in the second cycle.

9. The method of claim 8 further comprising the steps of:
in response to the selection of a path performing the steps of:
constructing a first set of arcs on the first path, each of the arcs linking an upstream node and a downstream node, the upstream node in each of the arcs having a node value which is not less than a node value of the downstream node; and
constructing a second set of arcs on the first path, each of the arcs connecting an upstream node and a downstream node, the upstream node in each of the arcs having a node value which is not greater than a node value of the downstream node.

10. The method of claim 9 wherein:
the first source node value is greater than the second source node value; and
a first one of the starting and ending nodes corresponds to the source node and wherein in response to the source node corresponding to the starting node, the starting node is provided having the first source node value and in response to the ending node corresponding to the source node, the ending node is provided having the second source node value.

11. The method of claim 8 further comprising the steps of:
in response to the selection of a second cycle performing the steps of:
constructing a first set of arcs on the second cycle, each of the arcs connecting an upstream node and a downstream node, the upstream node in each of the arcs having a node value which is not less than a node value of the downstream node; and
constructing a second set of arcs on the second cycle, each of the arcs connecting an upstream node and a downstream node, the upstream node in each of the arcs having a node value which is not greater than a node value of the downstream node.

12. The method of claim 11 wherein:
the first source node value is greater than the second source node value; and
a first one of the starting and ending nodes corresponds to the source node and wherein in response to the source node corresponding to the starting node, the starting node is provided having the first source node value and in response to the ending node corresponding to the source node, the ending node is provided having the second source node value.

13. A computer program product comprising:
a computer useable medium having computer readable program code to select a source node from a plurality of nodes;
a computer useable medium having computer readable program code to select a cycle around the source node, wherein the cycle includes a first plurality of nodes;
a computer useable medium having computer readable program code to assign a first source value to the source node;
a computer useable medium having computer readable program code to assign a second different source value to the source node;
a computer useable medium having computer readable program code to assign a node value to each of the first plurality of nodes wherein the node value assigned to each node decreases in the first direction around the cycle;
a computer useable medium having computer readable program code to construct a first set of arcs, each of the arcs connecting an upstream node and a downstream node, the upstream node in each of the arcs having a node value which is not less than the node value of the downstream node; and
a computer useable medium having computer readable program code to construct a second set of arcs, each of the arcs connecting an upstream node and a downstream node, the upstream node in each of the arcs having a node value which is not greater than the node value of the downstream node.

14. The computer program product of claim 13 further comprising:
   a computer useable medium having computer readable program code to determine if the first plurality of nodes in the cycle includes each of the plurality of nodes in the network;
   a computer useable medium having computer readable program code to select a first path having a starting node, an ending node and at least one intermediate node wherein the starting node corresponds to one of the first plurality of nodes in the cycle, the ending node corresponds to a second different one of the first plurality of nodes in the cycle and each of the at least one intermediate nodes correspond to nodes not included in the first plurality of nodes in the cycle and wherein the value of the starting node is greater than the value of the ending node; and
   a computer useable medium having computer readable program code to assign a node value to each of the at least one intermediate nodes wherein the node values assigned to each of the at least one intermediate nodes do not increase when traversing the path in a direction from the starting node to the ending node.

15. The computer program product of claim 14 wherein the computer readable program code means to assign a node value to each of the at least one intermediate nodes comprises:
   a computer useable medium having computer readable program code to assign the intermediate node immediately prior to the end node a value which is not less than the maximum of: (i) the second value of the source node and (ii) the value of any node included in the cycle and the path and already assigned a value which is smaller than the value of the starting node.

16. The computer program product of claim 15 further comprising:
   a computer useable medium having computer readable program code to construct a first set of arcs on the first path, each of the arcs linking an upstream node and a downstream node, the upstream node in each of the arcs having a node value which is not less than the node value of the downstream node; and
   a computer useable medium having computer readable program code to construct a second set of arcs on the first path, each of the arcs connecting an upstream node and a downstream node, the upstream node in each of the arcs having a node value which is not greater than the node value of the downstream node.

17. A computer program product comprising:
   a computer useable medium having computer readable program code to select a source node from a plurality of nodes to be included in a network;
   a computer useable medium having computer readable program code to select a first cycle around the source node, wherein the first cycle includes a first plurality of nodes;
   a computer useable medium having computer readable program code to assign first and second source node values to the source node;
   a computer useable medium having computer readable program code to assign first and second node values to each of the first plurality of nodes wherein first ones of the first and second node values assigned to each node do not increase in value in a first direction around the first cycle and second ones of the first and second node values assigned to each node do not increase in value in the first direction around the first cycle and wherein for each node the first node value is greater than the second node value;
   a computer useable medium having computer readable program code to construct a first set of arcs, each of the arcs linking an upstream node and a downstream node in the first cycle, the upstream node in each of the arcs having a node value which is not less than a node value of the downstream node; and
   a computer useable medium having computer readable program code to construct a second set of arcs, each of the arcs connecting an upstream node and a downstream node in the first cycle, the upstream node in each of the arcs having a node value which is not greater than a node value of the downstream node.

18. The computer program product of claim 17 further comprising the steps of:
   a computer useable medium having computer readable program code to determine if the first plurality of nodes in the first cycle includes each of the plurality of nodes to be included in the network;
   a computer useable medium having computer readable program code to select a first one of a path and a cycle, the computer readable program code to select comprising:
      a computer useable medium having computer readable program code to select a first path in having a starting node, an ending node and at least one intermediate node wherein the starting node corresponds to one of the first plurality of nodes in the cycle, the ending node corresponds to a second different one of the first plurality of nodes in the cycle and each of the at least one intermediate nodes correspond to nodes not included in the first plurality of nodes in the cycle and wherein the first value of the starting node is greater than the first value of the ending node;
      a computer useable medium having computer readable program code to assign first and second node values to each of the at least one intermediate nodes wherein first ones of the node values assigned to each of the at least one intermediate nodes do not increase in value when traversing the path in a direction from the starting node to the ending node and wherein second ones of the node values assigned to each of the at least one intermediate nodes do not increase in value when traversing the path in a direction from the starting node to the ending node and wherein for each intermediate node the first node value is greater than the second node value;
      a computer useable medium having computer readable program code to select a second cycle having a second source node and at least one intermediate node wherein the second source node corresponds to one of the first plurality of nodes in the first cycle and each of the at least one intermediate nodes correspond to nodes not included in the first plurality of nodes in the first cycle; and
      a computer useable medium having computer readable program code to assign first and second node values to each of the at least one intermediate nodes wherein first ones of the first and second node values assigned to each of the at least one intermediate nodes do not increase in value in a first direction around the second cycle and second ones of the first and second node values assigned to each node do not increase in value in the first direction around the second cycle and wherein for each intermediate node the first node value is greater than the second node value.

19. The computer program product of claim 18 wherein the computer useable medium having computer readable program code to assign first and second node values to each of the at least one intermediate nodes comprises:
 a computer useable medium having computer readable program code to assign the intermediate node adjacent to a first one of the end node and the starting node a value which is not less than the maximum of a first one of:
  (i) a first one of:
   the first value of all of the nodes included in the first cycle and the path having a value which is smaller than the first value of the first node in the path; and
   the second value of all of the nodes included in the first cycle and path having a value which is smaller than the first value of the first node in the path;
  (ii) a first one of:
   the first value of all of the nodes included in the first cycle and the second cycle having a value which is smaller than the value of the second source in the second cycle; and
   the second value of all of the nodes included in the first cycle and the second cycle having a value which is smaller than the first value of the second node in the second cycle.

20. The computer program product of claim 19 further comprising:
 a computer useable medium having computer readable program code to construct a first set of arcs on the first path, each of the arcs linking an upstream node and a downstream node, the upstream node in each of the arcs having a node value which is not less than a node value of the downstream node; and
 a computer useable medium having computer readable program code to construct a second set of arcs on the first path, each of the arcs connecting an upstream node and a downstream node, the upstream node in each of the arcs having a node value which is not greater than a node value of the downstream node.

21. The computer program product of claim 19 further comprising:
 a computer useable medium having computer readable program code to select a first set of arcs along the path between the starting node and the ending node wherein a value of each of the nodes decrease along the direction of the arc; and
 a computer useable medium having computer readable program code to select a second set of arcs along the path between the starting node and the ending node wherein a value of each of the nodes increases along the direction of the arcs.

22. The computer program product of claim 19 further comprising:
 a computer useable medium having computer readable program code to construct a first set of arcs on the second cycle, each of the arcs connecting an upstream node and a downstream node, the upstream node in each of the arcs having a node value which is not less than a node value of the downstream node; and
 a computer useable medium having computer readable program code to construct a second set of arcs on the second cycle, each of the arcs connecting an upstream node and a downstream node, the upstream node in each of the arcs having a node value which is not greater than a node value of the downstream node.

23. The computer program product of claim 19 further comprising:
 a computer useable medium having computer useable program code to select a first set of arcs along the path between the starting node and the ending node wherein the value of each of the nodes decrease along the direction of the arc; and
 a computer useable medium having computer useable program code to select a second set of arcs along the path between the starting node and the ending node wherein a value of each of the nodes increases along the direction of the arcs.

24. A network comprising:
 a plurality of nodes each of the nodes comprising:
  means for exchanging network topology information with each of the plurality of nodes;
  means for computing a plurality of directed trees wherein at least two of the plurality of directed trees are redundant after failure of a first one of a node and a link; and
  means for transmitting the plurality of directed trees computed in each of the nodes to first ones of the plurality of nodes.

25. The network of claim 24 wherein said means for computing a plurality of directed trees includes means for computing a plurality of directed spanning trees.

26. A network comprising:
 a plurality of nodes each of the nodes coupled by a link and each of the nodes comprising:
  means for transmitting network topology information to a first one of the plurality of nodes;
  means for providing traffic information to the first one of the plurality of nodes and wherein the first one of the plurality of nodes comprises:
   means for computing a plurality of trees for each of the plurality of nodes and transmitting the tree information from the first one of the plurality of nodes to the remainder of the plurality of nodes wherein at least two of the plurality of directed trees are redundant after failure of a first one of a node and a link.

27. The network of claim 26 wherein said means for computing a plurality of directed trees includes means for computing a plurality of directed spanning trees.

28. A method for generating two directed trees for automatic protection switching comprising the steps of:
 selecting a source node having first and second source node values;
 selecting a first cycle around the source node, the first cycle including a plurality of nodes;
 ordering the plurality of nodes in decreasing order in a first direction around the cycle and in increasing order in a second opposite direction around the cycle;
 constructing two sets of arcs;
 selecting a first one of a path and a cycle which includes a node not already included in the first cycle; and
 ordering any node not already ordered such that a value assigned to each node does not increase in the value when traversing the cycle in the first direction and does not decrease in value when traversing the cycle in the second direction.

29. The method of claim 28 further comprising the steps of:

connecting the arcs included in the first set of arcs to provide a first tree topology; and connecting the arcs included in the second set of arcs to provide a second different tree topology.

30. A method of providing a network having a plurality of nodes with a logical tree topology, the method comprising the steps of:

(a) selecting a first cycle containing a first plurality of nodes with a first one of the first plurality of nodes corresponding to a first source node;

(b) determining if the first cycle includes all nodes to be included in the network;

(c) in response to the first cycle not including all nodes to be included in the network, then performing the steps of:

(i) selecting a first starting node from the plurality of nodes in the first cycle;

(ii) assigning a first starting node value to the first starting node;

(iii) selecting a first ending node from the plurality of nodes in the first cycle;

(iv) assigning a first ending node value to the first ending node;

(v) selecting a first path between the first starting node and the first ending node which includes at least one intermediate node not included in the first cycle;

(vi) assigning a node value to each of the at least one intermediate nodes.

31. The method of claim 30 further comprising the steps of:

(vii) determining if the first cycle and first path include all of the nodes to be included in the network;

(viii) in response to the first cycle and first path not including all nodes to be included in the network, then performing the steps of:

(a) selecting a next starting node from the plurality of nodes in a first one of the first cycle and first path;

(b) selecting a first ending node from the plurality of nodes in a first one of the first cycle and first path;

(c) selecting a next path between the first starting node and the first ending node which includes at least one node not included in the first cycle and first path; and (d) repeating steps (a)–(c) until each of the plurality of nodes in the network are included in at least one of a path or a cycle.

32. The method of claim 31 wherein in response to the cycle selected in step (a) including all nodes to be included in the network, the method comprises the steps of:

assigning a first and second source node values to the first source node; and ordering the nodes in a predetermined order.

33. A network comprising:

a plurality of nodes;

a first plurality of links each of said first plurality of links having a first end coupled to a first one of the plurality of nodes and a second end coupled to a second different one of the plurality of nodes such that the nodes and first plurality of links form a first tree topology; and a second plurality of links each of said second plurality of links having a first end coupled to a first one of the plurality of nodes and a second end coupled to a second different one of the plurality of nodes such that the nodes and links form a second tree topology and wherein in response to failure of any of the nodes or first or second plurality of links, each of said plurality of nodes remain mutually connected through at least one of said first and second tree topologies.

34. The network of claim 33 wherein at least one of the plurality of nodes comprises an automatic switch protection processor for automatically logically connecting each of the nodes to a first one of the first and second tree topologies.

35. A network planning system comprising:

means for selecting a source node;

means for selecting a cycle around the source node, wherein the cycle includes a source node a first plurality of nodes;

means for assigning a first source node value to the source node;

means for assigning a second different source node value to the source node;

means for assigning a node value to each of the first plurality of nodes wherein the node value assigned to each node decreases in a first direction around the cycle;

means for constructing a first set of arcs each of the arcs connecting an upstream node and a downstream node, the upstream node in each of the arcs having a node value which is not less than the node value of the downstream node; and means for constructing a second set of arcs, each of the arcs connecting an upstream node and a downstream node, the upstream node in each of the arcs having a node value which is not greater than the node value of the downstream node.

36. The network planning system of claim 35 wherein said means for assigning a node value to each of the first plurality of nodes wherein the node value assigned to each node decreases in a first direction around the cycle further comprises means for assigning a second node value to each of the first plurality of nodes wherein the second node value assigned to each node increases in a second opposite direction around the cycle.

37. The network planning system of claim 35 further comprising:

means for receiving network topology information; and means for connecting the first set of arcs to provide a first logical tree topology and for connecting the second set of arcs to provide a second logical tree topology.

38. A method of generating two directed trees for automatic protection switching in an optical network, the method comprising the steps of:

identifying a source node;

selecting a first cycle containing the source node;

determining if the cycle includes all nodes in a graph;

in response to the cycle not containing all the nodes in a graph, selecting a first path that starts on some node in the first cycle;

determining if the first cycle and first path do not include all the nodes of the graph;

in response to the cycle and path not including all the nodes in the graph, constructing another path starting on some node already included in one of the first cycle and first path and passing through one or more nodes not included in one of the first cycle and first path and ending on another node included in one of the first cycle and first path; and ordering the nodes in accordance with a predetermined criteria.

* * * * *

UNITED STATES PATENT AND TRADEMARK OFFICE
CERTIFICATE OF CORRECTION

PATENT NO. : 6,047,331
DATED : April 4, 2000
INVENTOR(S) : Medard et al.

It is certified that error appears in the above-identified patent and that said Letters Patent is hereby corrected as shown below:

On the title page, Section [75], on the third line delete "Cambridge" and replace with --Brookline--.

Col. 1, line 28, delete "made" and replace with --may--.

Col. 15, line 20 after "may" insert --be--.

Col. 17, line 46 delete "a" and replace with --at--.

Col. 18, line 29 delete "an" and replace with --a--.

Signed and Sealed this

Twenty-ninth Day of May, 2001

*Attest:*

NICHOLAS P. GODICI

*Attesting Officer*     *Acting Director of the United States Patent and Trademark Office*